US012572299B2

(12) United States Patent
Sharma et al.

(10) Patent No.: US 12,572,299 B2
(45) Date of Patent: Mar. 10, 2026

(54) METHOD AND APPARATUS TO IMPLEMENT AN INTEGRATED CIRCUIT INCLUDING BOTH DYNAMIC RANDOM-ACCESS MEMORY (DRAM) AND STATIC RANDOM-ACCESS MEMORY (SRAM)

(71) Applicant: INTEL CORPORATION, Santa Clara, CA (US)

(72) Inventors: Abhishek Anil Sharma, Portland, OR (US); Wilfred Gomes, Portland, OR (US); Pushkar Ranade, San Jose, CA (US); Rajabali Koduri, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 830 days.

(21) Appl. No.: 17/711,394

(22) Filed: Apr. 1, 2022

(65) Prior Publication Data

US 2023/0315331 A1 Oct. 5, 2023

(51) Int. Cl.
G06F 3/06 (2006.01)

(52) U.S. Cl.
CPC .......... G06F 3/0655 (2013.01); G06F 3/0604 (2013.01); G06F 3/0673 (2013.01)

(58) Field of Classification Search
CPC . G11C 11/419; G11C 11/005; G11C 11/4076; G11C 5/025; G06F 12/0848; G06F 30/337; G06F 3/0673; G06F 3/0604; G06F 3/0655; G06F 12/0855; G06F 12/0811; G06F 15/7807; G06F 12/0886; G06F 2212/402; G06F 12/0888; G06F 2212/221; G06F 12/0284; G06F 12/1408; G06F 2212/507; G06F 2212/1016; G06F 2212/401
See application file for complete search history.

(56) References Cited

U.S. PATENT DOCUMENTS

2008/0126716 A1* 5/2008 Daniels .............. G06F 12/0897
711/E12.043
2009/0144504 A1 6/2009 Barth et al.
(Continued)

OTHER PUBLICATIONS

"Project 3: Cache and Cache Controller", Available Online at <https://www.engineering.iastate.edu/~zzhang/courses/cpre585-f03/projects/dcache.htm>, Retrieved on Mar. 1, 2022, 6 pages.
(Continued)

*Primary Examiner* — Jared I Rutz
*Assistant Examiner* — Chen Gu
(74) *Attorney, Agent, or Firm* — NICHOLSON DE VOS WEBSTER & ELLIOTT LLP

(57) ABSTRACT
Methods and apparatus to implement an integrated circuit including both dynamic random-access memory (DRAM) and static random-access memory (SRAM). In one embodiment, the integrated circuit comprises a static random-access memory (SRAM) device to store a first portion of data of a processor, a dynamic random-access memory (DRAM) device to store a second portion of the data of the processor, and a memory control circuit to read from both the SRAM and DRAM devices, a first set of bits of a first word to be read from the SRAM device and a second set of bits of the first word to be read from the DRAM device.

18 Claims, 14 Drawing Sheets

(56) References Cited

U.S. PATENT DOCUMENTS

| | | | |
|---|---|---|---|
| 2014/0025880 A1 | 1/2014 | Yu et al. | |
| 2014/0281189 A1* | 9/2014 | Noguchi et al. | |
| 2017/0139726 A1* | 5/2017 | Holden | G11C 14/0054 |
| 2017/0277637 A1* | 9/2017 | Willcock | G11C 11/403 |
| 2019/0326296 A1* | 10/2019 | Wang | H10B 12/50 |
| 2020/0035683 A1 | 1/2020 | Sharma et al. | |
| 2020/0279850 A1 | 9/2020 | Sharma et al. | |
| 2023/0058668 A1* | 2/2023 | Roberts | G06F 12/1408 |

OTHER PUBLICATIONS

Amat et al., "Modern Gain-Cell Memories in Advanced Technologies", 2018 IEEE 24th International Symposium on On-Line Testing And Robust System Design (IOLTS), Jul. 2018, 4 pages.
Zhang et al., "Frequent Value Locality and Value-Centric Data Cache Design", ACM SIGARCH Computer Architecture News, vol. 28, No. 5, Dec. 2000, pp. 150-159.
Non-Final Office Action, U.S. Appl. No. 17/711,286, Apr. 25, 2025, 15 pages.
Notice of Allowance, U.S. Appl. No. 17/711,286, Aug. 7, 2025, 10 pages.

* cited by examiner

600

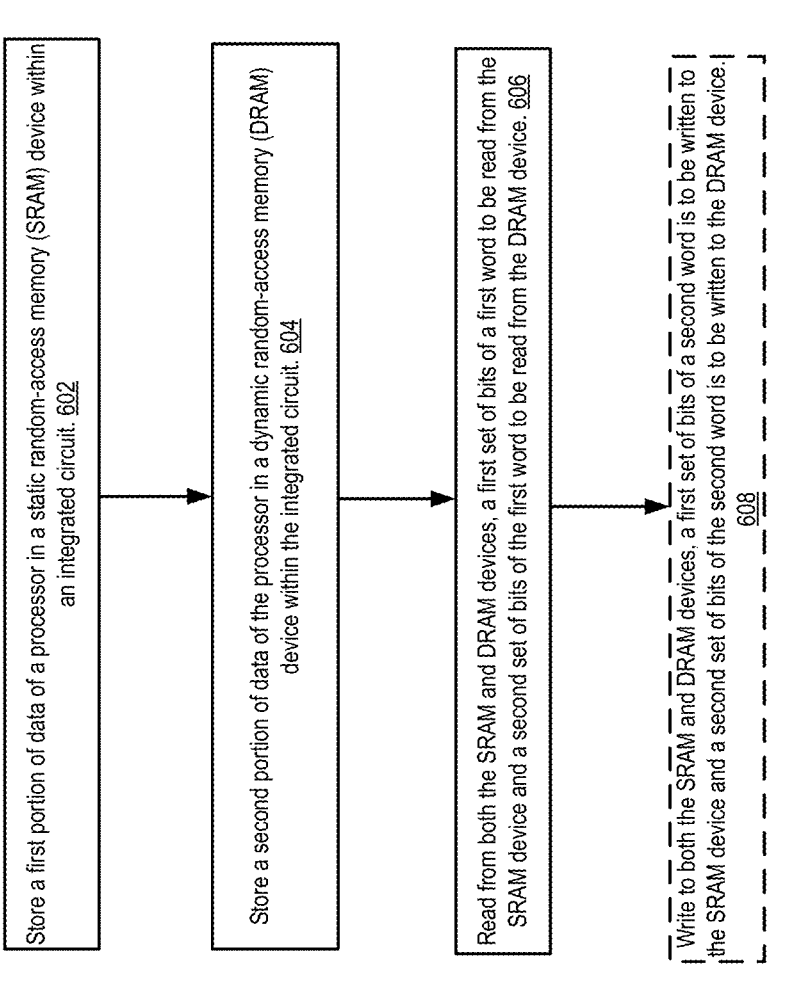

Store a first portion of data of a processor in a static random-access memory (SRAM) device within an integrated circuit. 602

Store a second portion of data of the processor in a dynamic random-access memory (DRAM) device within the integrated circuit. 604

Read from both the SRAM and DRAM devices, a first set of bits of a first word to be read from the SRAM device and a second set of bits of the first word to be read from the DRAM device. 606

Write to both the SRAM and DRAM devices, a first set of bits of a second word is to be written to the SRAM device and a second set of bits of the second word is to be written to the DRAM device. 608

Figure 6

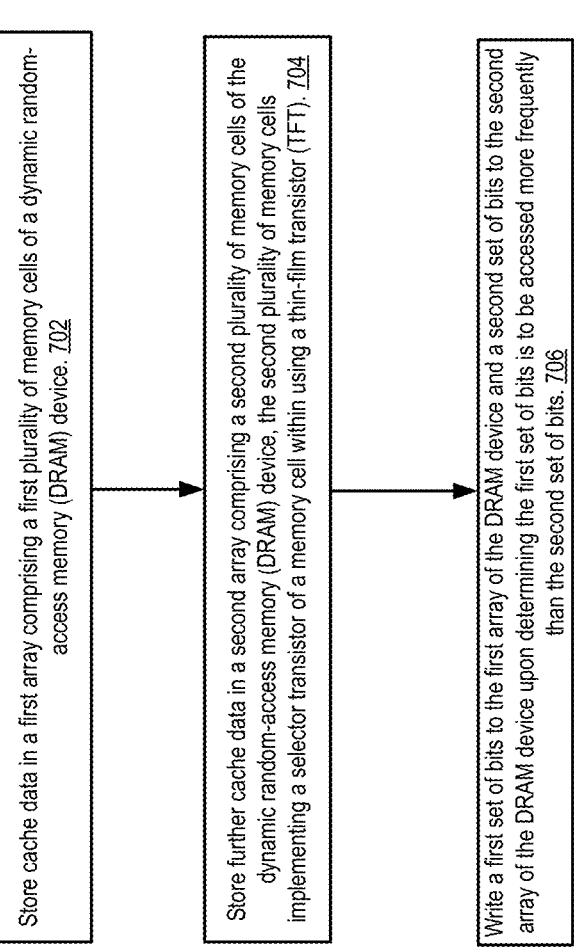

700

Store cache data in a first array comprising a first plurality of memory cells of a dynamic random-access memory (DRAM) device. 702

Store further cache data in a second array comprising a second plurality of memory cells of the dynamic random-access memory (DRAM) device, the second plurality of memory cells implementing a selector transistor of a memory cell within using a thin-film transistor (TFT). 704

Write a first set of bits to the first array of the DRAM device and a second set of bits to the second array of the DRAM device upon determining the first set of bits is to be accessed more frequently than the second set of bits. 706

Figure 7

METHOD AND APPARATUS TO IMPLEMENT AN INTEGRATED CIRCUIT INCLUDING BOTH DYNAMIC RANDOM-ACCESS MEMORY (DRAM) AND STATIC RANDOM-ACCESS MEMORY (SRAM)

TECHNICAL FIELD

Embodiments of the invention relate to the field of computing system; and more specifically, the embodiments are related to an apparatus and method to design more efficient dynamic random-access memory (DRAM) and integrated circuits.

BACKGROUND ART

Embedded memory is important to the performance of modern system on a chip (SoC) technology. Static random-access memory (SRAM) is one example of embedded memory, particularly suitable for modern SoC due to its compatibility with fabrication processes used to manufacture computing logic, e.g., front end of line (FEOL) processes. However, for some applications demanding large on-die cache, such as tens of megabytes (MBs) for handling memory bandwidth, the area and standby power of a SRAM-based cache may pose significant challenges to SoC design. Alternative higher-density embedded memory technology, such as dynamic random-access memory (DRAM) and in particular, embedded DRAM (eDRAM), has been introduced to address the limitation in density and standby power of a large SRAM-based cache.

While an eDRAM-based cache on a SoC system provides better cache performance than a large SRAM-based cache on a similar SoC system, the performance of eDRAM-based cache can be further improved by design changes.

BRIEF DESCRIPTION OF THE DRAWINGS

The invention may best be understood by referring to the following description and accompanying drawings that are used to show embodiments of the invention. In the drawings:

FIG. 6 illustrates the operation flow of reading bits from and writing bits to both a static random-access memory (SRAM) device and a dynamic random-access memory (DRAM) device per some embodiments.

FIG. 7 illustrates the operation flow of an integrated circuit operating based on data access characteristics per some embodiments.

DETAILED DESCRIPTION

Figure 1:
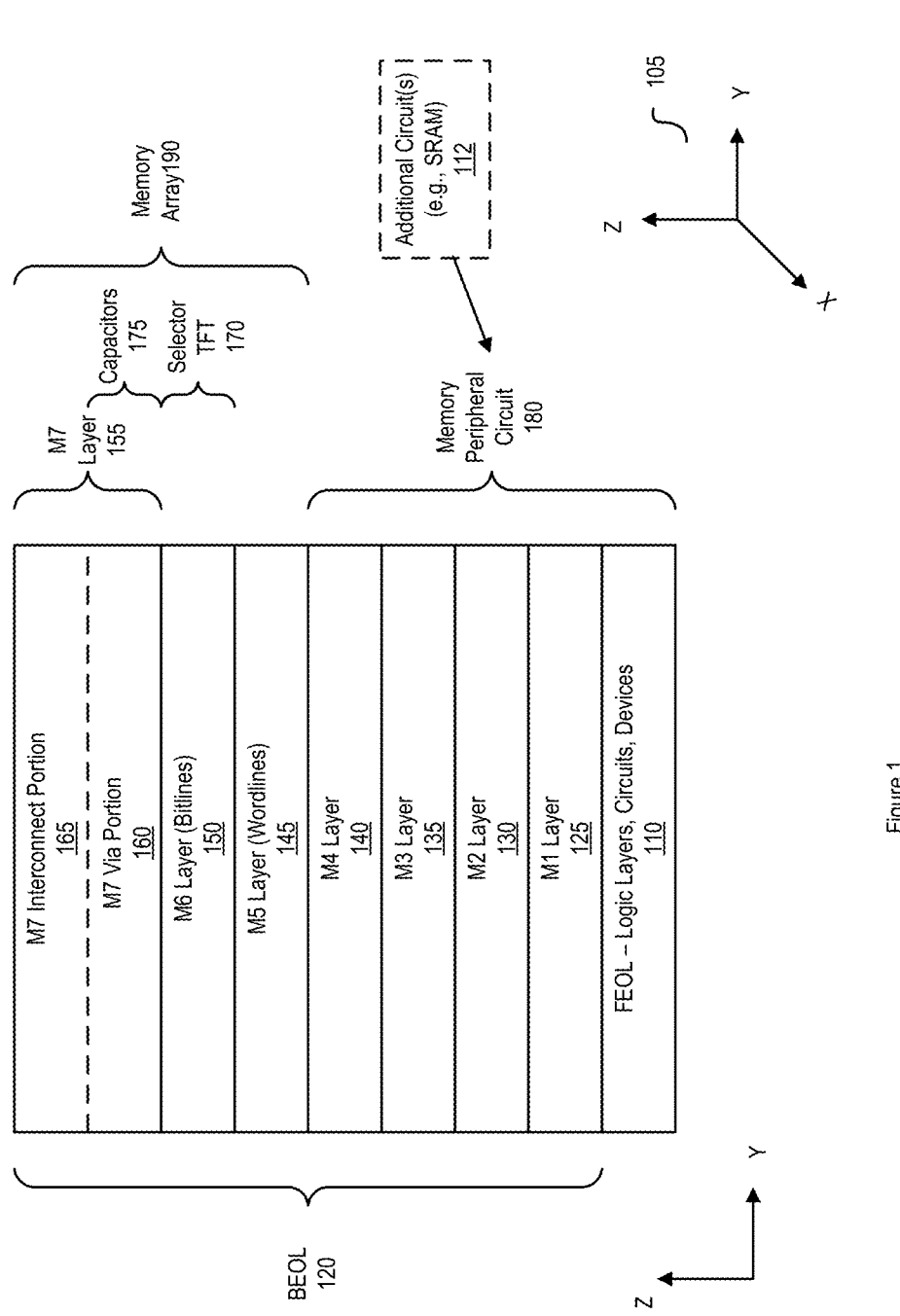
FIG. 1 provides a schematic illustration of a cross-sectional view of an Integrated Circuit (IC) device (e.g., a chip) according to some embodiments of the present disclosure.

In the following description, numerous specific details are set forth. However, it is understood that embodiments of the invention may be practiced without these specific details. In other instances, well-known circuits, structures, and techniques have not been shown in detail in order not to obscure the understanding of this description.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening layers. A "set," as used herein, refers to any positive whole number of items including one item.

In the following description, various aspects of the illustrative implementations will be described using terms commonly employed by those skilled in the art to convey the substance of their work to others skilled in the art. For example, the terms "oxide," "carbide," "nitride," etc. may refer to compounds containing, respectively, oxygen, carbon, nitrogen, etc. In yet another example, a "high-k dielectric" may refer to a material having a higher dielectric constant (k) than silicon oxide, while a "low-k dielectric" may refer to a material having a lower k than silicon oxide. The terms "substantially," "close," "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5 to 20% of a target value based on the context of a particular value as described herein or as known in the art. As used herein, a "logic state" (or, alternatively, a "state" or a "bit" value) of a dynamic random-access memory (DRAM) (e.g., an embedded DRAM) memory cell may refer to one of a finite number of states that the cell can have, e.g., logic states "1" and "0," each state represented by a different voltage of the capacitor of the cell. In another example, as used herein, a "READ" and "WRITE" memory access or operations refer to, respectively, determining/sensing a logic state of a memory cell and programming/setting a logic state of a memory cell. In other examples, the term "connected" means a direct electrical or magnetic connection between the things that are connected, without any intermediary devices, while the term "coupled" means either a direct electrical or magnetic connection between the things that are connected or an indirect connection through one or more passive or active intermediary devices. The term "circuit" means one or more passive and/or active components that are arranged to cooperate with one another to provide a desired function Exemplary Embedded DRAM (eDRAM) Devices Some embodiments of the present disclosure use eDRAM memory cells and arrays, as well as corresponding methods and devices. An exemplary eDRAM memory array implements a memory cell that uses a TFT as a selector transistor. One source/drain (S/D) electrode of the TFT is coupled to a capacitor for storing a memory state of the cell, while the other S/D electrode is coupled to a bitline. The bitline may be a shallow bitline in that the thickness of the bitline may be smaller than the thickness of one or more metal interconnects provided in the same metal layer as the bitline but used for providing electrical connectivity for components outside of the memory array. Such a bitline may be formed in a separate process than said one or more metal interconnects. In an embodiment, the memory cells may be formed in a back end of line process. Note that a memory cell is also referred to as a bit cell.

Some memory devices may be considered "standalone" devices in that they are included in a chip that does not also include computing logic (e.g., transistors for performing processing operations). Other memory devices may be included in a chip along with computing logic and may be referred to as "embedded" memory devices or integrated circuit devices (or simply integrated circuits). Using embedded memory to support computing logic may improve performance by bringing the memory and the computing logic closer together and eliminating interfaces that increase latency. Various embodiments of the present disclosure relate to embedded DRAM memory cells and corresponding methods and devices.

A standard eDRAM memory cell includes a capacitor for storing a bit (logical 1 or 0) and a selector transistor. Due to the leakage from the selector transistor, the capacitor is continuously refreshed to restore the voltage to an operational level. In some eDRAM approaches, the selector transistor is implemented as a logic transistor, e.g., a FEOL, logic-process-based, selector transistor, creating multiple challenges.

FIG. 1 provides a schematic illustration of a cross-sectional view of an Integrated Circuit (IC) device (e.g., a chip) 100, according to some embodiments of the present disclosure. FIG. 1 illustrates an exemplary coordinate system 105 with axes x-y-z so that the various planes illustrated in the figure and in some subsequent figures may be described with reference to this coordinate system, e.g., the view shown in FIG. 1 is in the y-z plane, as indicated with y and z axes shown at the lower left corner the figure. The coordinate system 105 is not shown in subsequent figures in order to not clutter the drawings. The IC device 100 may be referred to as a TFT-eDRAM arrangement 100 because, as explained below, it will include a TFT-eDRAM included in one or more layers shown in the figure.

As shown in FIG. 1, the IC device 100 may include an FEOL 110 that includes most of the various logic layers, circuits, and devices to drive and control a logic IC. As also shown in FIG. 1, the IC device 100 also includes a BEOL 120 including, in the exemplary illustration of one embodiment of the present disclosure, seven metal interconnection layers: metal 1 (M1) layer 125, metal 2 (M2) layer 130, metal 3 (M3) layer 135, metal 4 (M4) layer 140, metal 5 (M5) layer 145, metal 6 (M6) layer 150, and metal 7 (M7) layer 155 that includes M7 interconnect portion 165 and M6 via portion 160. Various metal layers of the BEOL 120 may be used to interconnect the various inputs and outputs of the FEOL 110. Note that FEOL 110 comprises complementary metal-oxide-semiconductor (CMOS) logic transistor area in some embodiments, while the CMOS logic transistor area is separated from FEOL 110 but in the same layer as FEOL 110 in some other embodiments.

Generally speaking, and specifically illustrated for the M7 layer 155, each of the metal layers of the BEOL 120, e.g., each of the layers M1-M7 shown in FIG. 1, may include a via portion and an interconnect portion typically provided above the via portion (but which may be provided below the via portion in other embodiments). The interconnect portion of a metal layer is configured for transferring signals along metal lines (also sometimes referred to as "trenches") extending in the x-y plane (e.g., in the x or y directions), while the via portion is configured for transferring signals through metal vias extending in the z direction, e.g., to any of the adjacent metal layers above or below. Accordingly, vias connect metal structures (e.g., metal lines or vias) from one metal layer to metal structures of an adjacent metal layer. While referred to as "metal" layers, layers M1-M7 include only certain patterns of conductive metals, e.g., copper (Cu) or aluminum (Al), or metal alloys, or more generally, patterns of an electrically conductive material, formed in an insulating medium such as interlayer dielectric (ILD). The insulating medium may include any suitable ILD materials such as silicon oxide, silicon nitride, aluminum oxide, and/or silicon oxynitride.

As shown in FIG. 1, the IC device 100 may be further divided into a memory array 190 and a memory peripheral circuit 180. The memory peripheral circuit 180 may be built in the FEOL 110 and lower metal layers of the BEOL 120, e.g., M1-M4 layers, to control (e.g., access (read/write), store, refresh) the memory array 190. The memory array 190 may be a TFT-eDRAM memory array built in higher metal layers of the BEOL 120, e.g., in M5-M7 layers. As such, the memory array 190 may include low-leakage selector TFTs 170 (e.g., in the M6 layers) and capacitors 175 (e.g., in the M7 via portion 160), as well as wordlines (e.g., row selectors, e.g., in the M5 layer 145) and bitlines (e.g., column selectors, e.g., in the M6 layer 150) making up the TFT-eDRAM memory cells.

Compared to other eDRAM designs that locate a memory control circuit in the same layers as a memory array but in a different macro (or x-y) area of the integrated circuit than the memory array (such as at a periphery of the memory array), the IC device 100 advantageously locates the memory peripheral circuit 180 below the memory array 190 (e.g., substantially in the same x-y area), thus saving valuable x-y area in the finished integrated circuit. In further detail, the IC device 100 may embed the TFT-eDRAM memory cells in higher metal layers, e.g., M5, M6, and M7 via portion layers shown in FIG. 1. For example, the M5 layer 145 can contain the wordlines extending in e.g., the x direction to select a row of memory cells (bits) while the M6 layer 150 can contain the bitlines extending in the y direction to sense/read each of the TFT-EDRAM memory cells (bits) in the selected row and/or to write memory data to any of the memory cells in the selected row. In particular, the selector TFTs 170 can be fabricated (e.g., in the M6 layer 150) above the wordlines (that serve as or connect to the gate electrodes or contacts of the selector TFTs 170) and below the bitlines (that serve as either source or drain (S/D) electrodes or contacts). For example, a given selector TFT 170 may have a transistor gate below the thin-film active layer (that can be formed at the bottom of the M6 layer 150, such as in the via portion) and source and drain contacts above the thin-film layer.

In some embodiments, the metal gate of the selector TFT in different memory cells may be connected to a continuous M5 line below, such as a copper (Cu)-based metal line, which may provide much lower resistance compared to gate lines formed in the lower (e.g., FEOL) portions of the IC device 100. The continuous M5 line may be used as the wordline of the memory array 190, and may be covered by diffusion barriers or diffusion barrier layers including dielectric layers, such as silicon nitride, silicon carbide, or the like, with vias filled with metal-diffusion barrier films like tantalum nitride (TaN), tantalum (Ta), titanium zirconium nitride (e.g., $Ti_xZr_{1-x}N$, such as X=0.53), titanium nitride (e.g., TiN), titanium tungsten (TiW), or the like. A metal gate layer may cover the diffusion barrier film-filled vias, which electrically connect the copper (Cu) wordline to the metal gates of the selector TFTs, the diffusion barrier film preventing or helping to prevent the diffusion or migration of copper (Cu) from the wordline to the rest of the selector TFTs. An active thin-film layer (e.g., indium gallium zinc oxide, or IGZO) and then source and drain contacts above the thin film layer use the M6 layer 150. The space between the source and drain contacts determines the gate length of the selector TFT. A capacitor 175 may be a three-dimensional MIM capacitor embedded in the M7 via portion 160 of the M7 layer 155, below the M7 interconnect portion 165).

Note that the memory peripheral circuits 180 occupying the FEOL 110 and lower metal interconnection layers of the BEOL 120 underneath the memory array 190 (as illustrated in FIG. 1). Since more than 35% of the eDRAM memory macro area can be consumed by the peripheral (memory control) circuits, substantial savings of x-y macro area can be saved by fabricating the memory arrays 190 above the memory peripheral circuits 180, as in one or more embodiments of the present disclosure. In other words, according to some embodiments of the present disclosure, a TFT-eDRAM memory array may be provided with memory cells only using space in the upper metal layers (e.g., M5 layer and above), the peripheral circuits may be moved below the memory cells (e.g., in M4 layer and below, including the FEOL) and substantially reduce memory footprint area.

Additionally, the memory peripheral circuits 180 can be built to occupy less than the full space of the lower metal layers below the memory cells, the remaining space below the memory cells may be utilized to enhance the overall computing efficiency of a computing system that implements the eDRAM device. For example, the available space in the IC device may be occupied by one or more additional circuits 112 that interact with the memory peripheral circuit 180 and memory array 190 to provide better overall performance for the system implementing the IC device 100. In some embodiments, the one or more additional circuits 112 includes a static random-access memory (SRAM) device, and the memory control circuit(s) within the FEOL 110 may control the SRAM device as well as the memory array 190 of the eDRAM device as detailed herein below.

Figures 2A, 2B:
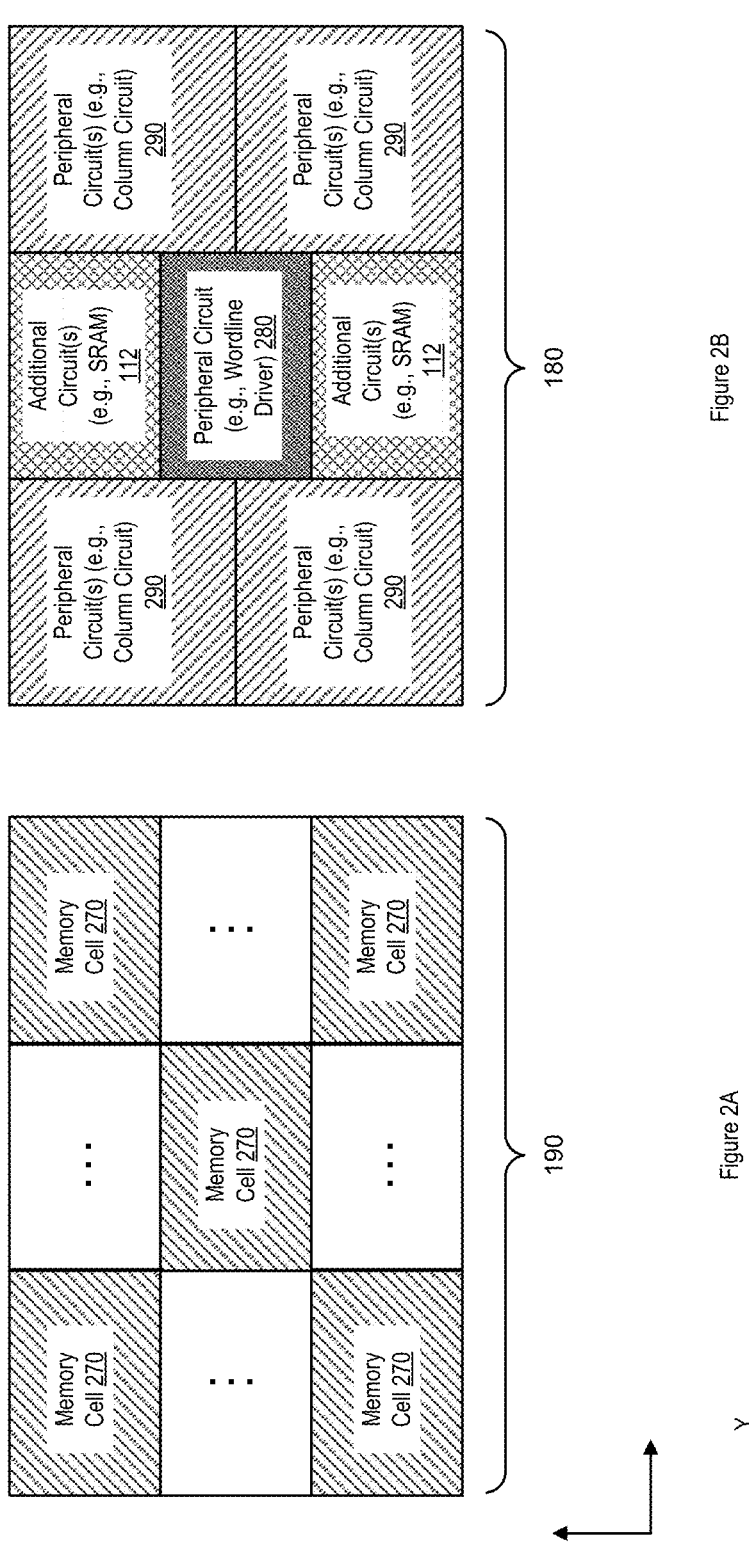
FIGS. 2A-2B are plane (y-x views) views of an example layout or floorplan of a TFT-eDRAM with overlap of the memory array, at least portions of the memory peripheral circuit, and one or more additional circuits according to some embodiments of the present disclosure.

FIGS. 2A-2B are plane (y-x views) views of an example layout or floorplan of a TFT-eDRAM with overlap of the memory array 190, at least portions of the memory peripheral circuit 180, and one or more additional circuits 112 according to some embodiments of the present disclosure. The memory array 190 may be made up of one or more memory cells 270 while the memory peripheral circuit 180 may include wordline drivers 280 and/or column circuits 290 as examples. Each of the column circuits 280 and bitline drivers 290 may further include devices such as read (bitline) sense amplifiers and pre-charging circuits. Note that the column circuits are also referred to as Column Input/Output (I/O) modules/circuits.

FIG. 2A shows the memory array 190 occupying the higher metal interconnection layers of the BEOL 120 (as illustrated in FIG. 1), therefore, the column circuits 290 and the wordline drivers 280, which are underneath, are not visible in the top view of FIG. 2A. FIG. 2B, other the other hand, shows the memory peripheral circuits 180 occupying the FEOL 110 and lower metal interconnection layers of the BEOL 120 underneath the memory array 190 (as illustrated in FIG. 1). Thus, as illustrated, FIG. 2A is a representation of one of the layers of the memory array 190 (one of the layers M5-M7) or a combination of two or more layers thereof (e.g., M5 and M6 layers superimposed in a top-down view). Similarly, FIG. 2B is a representation of one of the layers of the memory peripheral circuit 180 (one of the layers M1-M4 or FEOL) or a combination of two or more layers thereof (e.g., M1 and FEOL layers superimposed in a bottom-up view).

Since more than 35% of the eDRAM memory macro area can be consumed by the peripheral (memory control) circuits, substantial savings of x-y macro area can be saved by fabricating the memory arrays 190 above the memory peripheral circuits 180, as demonstrated in one or more embodiments of the present disclosure. In other words, according to some embodiments of the present disclosure, a TFT-eDRAM memory array 190 may be provided with memory cells 270 only using space in the upper metal layers (e.g., M5 layer and above), the peripheral circuits 180 may be moved below the memory array 190 (e.g., in M4 layer and below, including the FEOL) and substantially reduce memory footprint area. With the reduced footprint area of the eDRAM memory, the open area may be used to implement other devices such as the one or more additional circuits 112.

Note that by moving the peripheral circuits 180 physically closer to the memory array 190 and forming a closer connection, significant advantages in latency, power consumption, etc. are realized. The close proximity between the memory array 190 and peripheral circuits 180 also allows for more complicated logic to be implemented in or near the peripheral circuits 180 without expanding the memory footprint area.

System Integrating SRAM and DRAM

As known in the art, the accessing of static random-access memory (SRAM) to read/write data stored therein stays synchronized with the clock of a computing system that initiates the read/write requests, while DRAM operates asynchronously with the clock sending instructions as soon as it receives the instructions from an interface. SRAM is typically faster and uses less power than DRAM, yet DRAM can hold more data in the same footprint comparing to SRAM. The different characteristics lead to SRAM and DRAM to be used as different ICs at different levels of a memory system. For example, a SRAM IC may be used for a cache close to an execution engine (also referred to as execution circuitry/circuit/unit) of a processor core (e.g., Cache Level 1 or 2, L1/L2), and a DRAM IC may be used for a cache further away from the execution engine (e.g., Cache Level 3 or 4, L3/4). Yet integrating both SRAM and DRAM in the same IC may provide better performance, as explained in further details herein.

Figure 3:
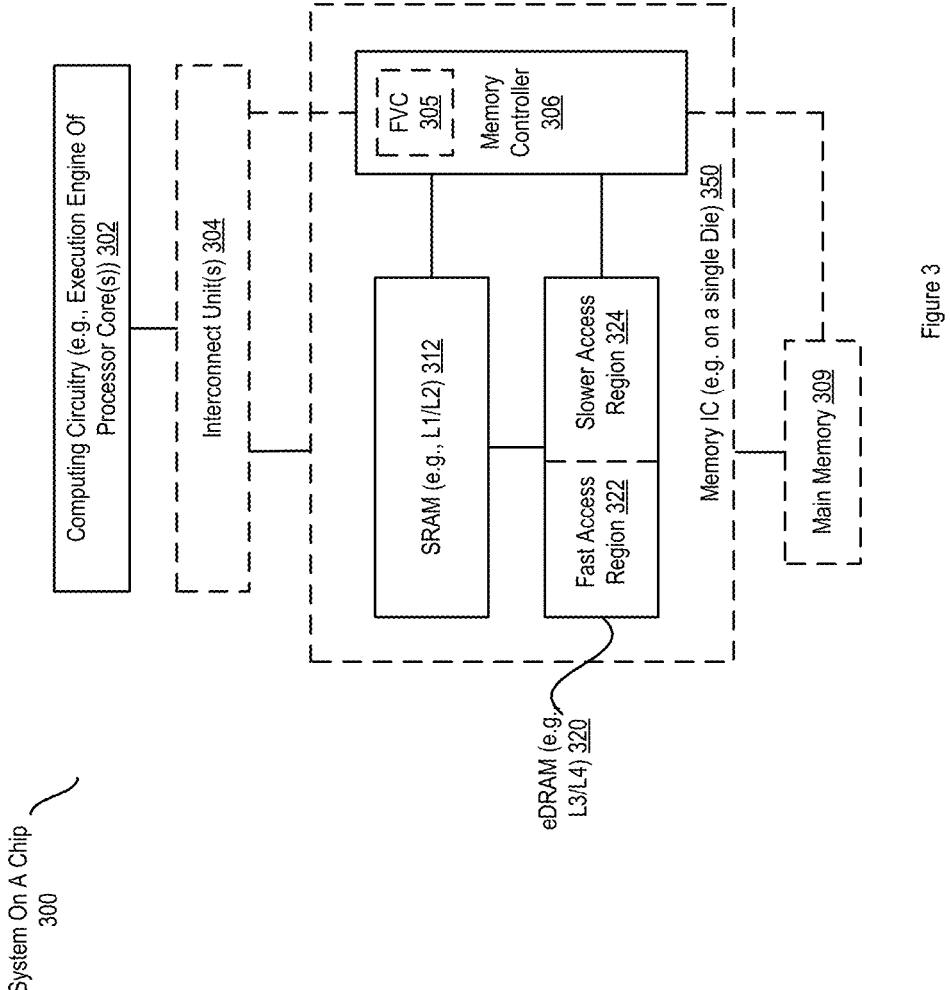
FIG. 3 shows a system on a chip system (SoC) with an integrated circuit including both static random-access memory (SRAM) and dynamic random-access memory (DRAM) per some embodiments.

FIG. 3 shows a system on a chip system (SoC) with an integrated circuit including both static random-access memory (SRAM) and dynamic random-access memory (DRAM) per some embodiments. The SoC 300 includes a computing circuitry (also referred to as computing logic/unit) 302 that decodes/executes instructions. The computing circuitry 302 may be an execution engine/circuit of a processor or processor core, the processor or processor core, general purpose computing graphics processing unit (GPGPU) core, graphics core, or the like. The computing circuitry 302 optionally coupled to one or more interconnect units 304, and the interconnect units 304 coupled to a memory integrated circuit (IC) 350. Alternatively, the computing circuitry 302 coupled to memory IC 350 without an interconnect unit. Memory IC 350 includes a SRAM device 312 and an eDRAM device 320. The SRAM device 312 is one of the additional circuits 112 illustrated in FIGS. 1 and 2B in some embodiments, and it can be packaged within an IC device implementing the eDRAM device 320 similar to the IC device 100 that includes an eDRAM and the additional circuits 112.

The SRAM device 312 and eDRAM device 320 may be packaged in the same die in some embodiments. Alternatively, the SRAM device 312 and eDRAM device 320 may be two ties bonded onto one chip carrier, or the SRAM device 312 and eDRAM device 320 may be implemented in a stacked die that includes one or more base dies.

The access to memory IC 350 is controlled by the memory controller 306, which coordinates access of memory IC 350 by the computing circuitry 302, interconnect unit(s) 304 (which may be coupled with other devices as explained in more details below), and/or main memory 309. While the memory controller 306 is within memory IC 350 in some embodiments, the memory controller 306 is outside of memory IC 350 in alternative embodiments. In some embodiments, memory IC 350 is packaged in the same chip as the computing circuitry 302 and is thus referred to as embedded memory IC. Different from previous approaches, the embedded memory IC includes both SRAM and DRAM devices.

In some embodiments, memory IC 350 implements a part or full hierarchical memory system of a processor/processor core. SRAM 312 is typically faster and uses less power than eDRAM 320, yet it holds less data in the same footprint. Thus SRAM 312 may be used to implement one or more caches close to the computing circuitry 302 (the closer to the computing circuitry 302, the faster the access is preferred) while eDRAM 320 to implement one or more caches further away in some embodiments (the further from the computing circuitry 302, the more stored data is preferred). For example, SRAM 312 may implement cache L1 and/or L2, eDRAM 320 implement cache L3 and/or L4.

The main memory 309 is even further away from the computing circuitry 302 logically, and it may be implemented as an off-chip device. The main memory 309 may be implemented using generic DRAM (which does not use the TFT as a selector transistor as the eDRAM discussed above), flash memory, flash memory, phase change memory (PCM), magnetic or optical cards, or other known storage devices.

With memory IC 350 being embedded with the computing circuitry 302, the SoC 300 utilizes heterogeneous memory devices in implementing both SRAM 312 and eDRAM 320. The heterogeneous memory devices have at least two types of memory devices with different access speeds, power consumption budgets, and footprints; and SRAM 312 utilizes the open area of the IC implementing eDRAM 320 thus does not increase the footprint of the IC implementing eDRAM 320. The memory IC 350 thus can take advantage of the features of both types of memory devices and offer performance and/or footprint efficiency that neither memory device can achieve on its own.

For example, the SRAM 312 and eDRAM 320 may be accessed (both reading out and writing to) concurrently, and the increased data access can make computation by computing circuitry 302 run more efficiently. Additionally, the memory array within eDRAM 320 may be logically separated into a fast access region 322 and slower access region 324 to provide further granularity of access speed to meet the requirement of some applications. Such access to different regions within eDRAM 320 may be controlled by a frequent value caching (FVC) logic/circuit 305 as discussed in further details below.

Note that while memory IC 350 can be used as cache memory, it can be also used as main memory storage as well. In some embodiments, memory IC 350, with or without the memory controller 306, may be manufactured by one vendor, while the computing circuitry 302 (and/or corresponding processor or processor cores) and/or interconnect unit(s) 304 may be manufactured by another. The memory IC 350 may interact with computing the computing circuitry 302 through a standardized interface in the latter case.

Figure 4:
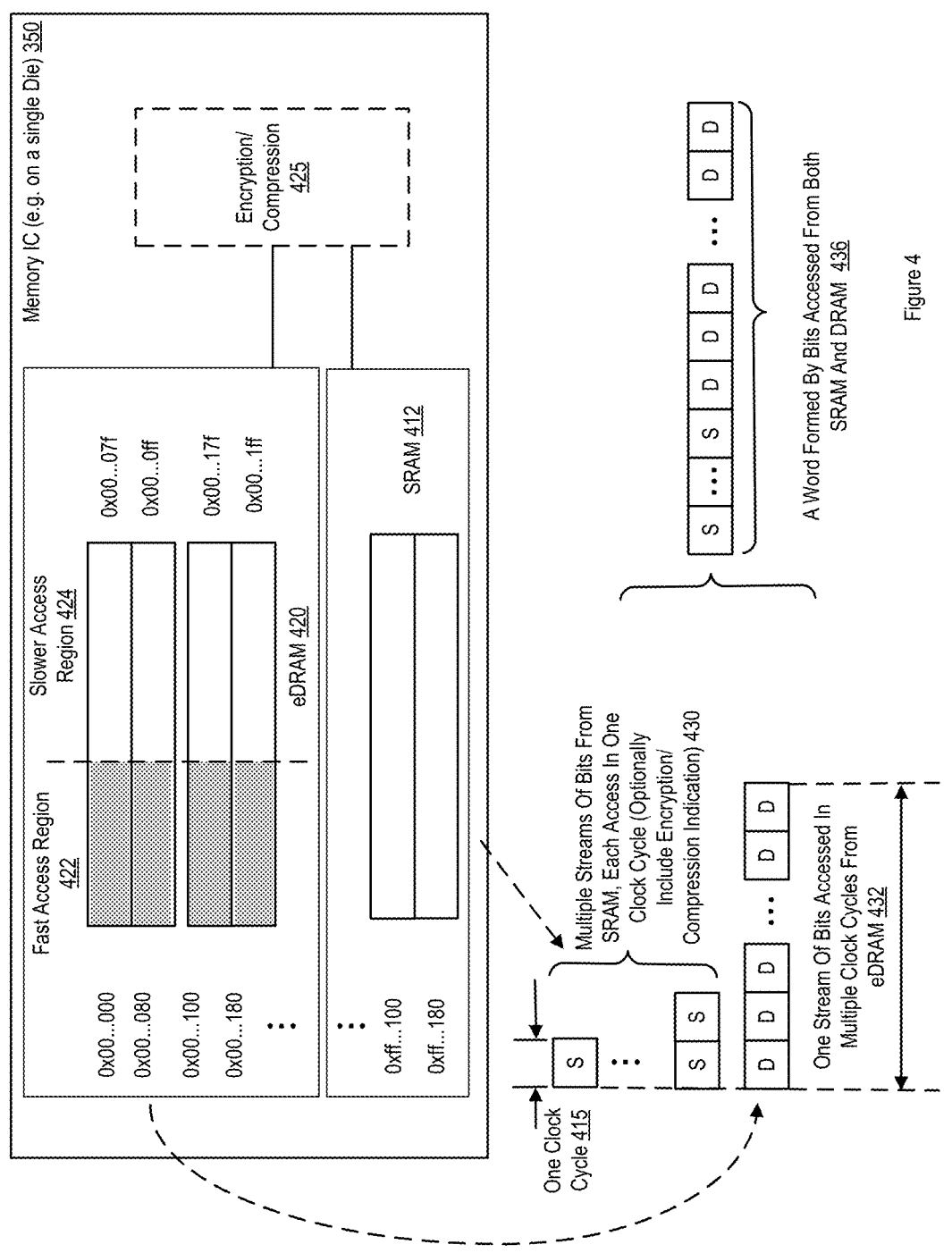
FIG. 4 shows data access to an integrated circuit including both static random-access memory (SRAM) and dynamic random-access memory (DRAM) per some embodiments.

FIG. 4 shows data access to an integrated circuit including both static random-access memory (SRAM) and dynamic random-access memory (DRAM) per some embodiments. Memory IC 350, with or without the memory controller 306, stores data for computation of computing circuitry as discussed herein above.

In some embodiments, memory IC 350 includes an encryption and/or compression logic/circuit 425 that processes data in accessing SRAM 412 and/or eDRAM 420. The encryption operations of the encryption logic/circuit may perform encryption/decryption on data while access the data of memory IC 350. For example, the encryption encodes data to enhance its security, while the decryption decodes encoded data so data in its unencrypted form may be utilized in execution. Similarly, the compression logic/circuit may perform compression/decompression on data while access the data of memory IC 350. For example, the compression compresses data to reduce the data size so it can be stored more efficiently, while decompression decompresses compressed data so data in its uncompressed form may be utilized in execution. In some embodiments, data is compressed (and/or encrypted) when it is written into SRAM 412 and/or eDRAM 420, and the data is decompressed (and/or decrypted) when it is read from SRAM 412 and/or eDRAM 420. Alternatively, data may be compressed (and/or encrypted) when it is read from SRAM 412 and/or eDRAM 420 and decompressed (and/or decrypted) when it is written into SRAM 412 and/or eDRAM 420. Also, other compression and encryption sequences may be implemented in some other embodiments. In some embodiments, data is not processed by the encryption and/or compression logic/circuit 425 when they are written into and/or read from SRAM 412 and/or eDRAM 420. Additionally, data compression and/or encryption or decompression and/or decryption may be performed on eDRAM 420 but not SRAM 412, or, on SRAM 412 but not eDRAM 420 in some embodiments.

In some applications, it is advantageous to read data from both SRAM 412 and eDRAM 420 concurrently. For example, machine learning and/or artificial intelligence applications often involve intense computation, and data of different precision provided concurrently can provide better computation efficiency. Data in a SRAM can be accessed faster but the SRAM stores less than DRAM in the same footprint, so low precision data (less bits) of an application can be stored in the SRAM while higher precision data (more bits) of the same application is to be stored in the DRAM. Reading out the low precision data fast from the SRAM will allow the computing circuitry to determine whether higher precision data is needed for the application; and if not, the data does not need to be read out from the DRAM (since it takes more clock cycles).

In another example, two values are to be multiplied and accumulated with a prior value. The most significant bits of the two values may be stored in SRAM 412 while the less significant bits are stored in eDRAM 420. The most significant bits are read out faster since data in SRAM 412 can be accessed faster, and the most significant bits can be multiplied first and get the earlier result while the less significant bits will complete their multiplication later due to the longer eDRAM 420 access time. The earlier result determines the scale of the multiplication of the two values and can be used to start the accumulation. In applications like this and others, the two level of data storage and corresponding data compression and/or encryption or decompression and/or decryption in SRAM 412 and eDRAM 420 provides better performance with their heterogenous data access characteristics.

FIG. 4 shows data process of an application, where data bits read from SRAM 412 and eDRAM 420 are merged for an application. In some embodiments, a single read operation of data bits from SRAM 412 takes one computing clock cycle as shown at reference 415, while a single read operation of data bits from eDRAM 420 takes multiple computing clock cycles; but the single read from eDRAM 420 may return more data bits than the single read from SRAM 412, as shown at reference 432. That is, the simultaneous read from both SRAM 412 and eDRAM 420 gets one or more streams of bits from SRAM 412 (multiple streams being possible because of its shorter read cycle comparing to eDRAM 420), and one stream of bits from eDRAM 420. In the illustrated example, a single bit is read in one clock cycle in one read operation, and two bits are read in another clock cycle from SRAM 412 in another read operation, but other number of bits may be read from SRAM 412 in one read operation as well. Note while the figure shows that the reads from SRAM 412 and eDRAM 420 are simultaneously starting from the same clock cycle, in some embodiments the reads may not be simultaneous, instead, they may be a few clock cycles apart, but the bits read from the reads from SRAM 412 and eDRAM 420 are merged to be the result of the reads.

Because of the access speed difference, in the time to perform a single read from eDRAM 420, multiple read operations may be performed on SRAM 412. The multiple read operations may be viewed as multiple streams of bits from SRAM 412 and the bits concatenated (also referred to as aggregated) from the multiple streams may include both data bits and control bits. For example, one control bit may indicate whether the bits concurrently read from eDRAM 420 is encrypted or not, or compressed or not as shown at reference 430. Additionally, the control bits from SRAM 412 may indicate the types of encryption/compression that bits read from eDRAM 420 use, and additional information about the encryption/compression. For example, the control bits from SRAM 412 may include a parity bit for the data read from eDRAM 420 so the data read from eDRAM 420 can be confirmed. The control bits from SRAM 412 may also include the key used to encrypt/decrypt the data read from eDRAM 420. These control bits from SRAM will allow the computing circuitry, memory controller, and other devices within a SoC system to prepare itself for the bits read from eDRAM 420 that arrive one or more clock cycles later. In some embodiments, only the control bits for the data read from eDRAM 420 are read from SRAM 412.

In some embodiments, the bits read from SRAM 412 and eDRAM 420 may be merged to form a block of data to be loaded into the computing circuitry to be executed. In one embodiment, the bits read from SRAM 412 and eDRAM 420 may form a word as shown at reference 436. A word is the natural unit of data used by a particular processor. A word is a fixed-sized datum handled as a unit by the instruction set (ISA) or the hardware of the processor. The number of bits can be transferred to and from a memory in a single operation is the word width (also referred to as word length) of a computer architecture in some embodiments. The word width can be 16, 32, 64, 128, 256, 512, 1024 bits or other bit width in multiple of power of two in some embodiments. In some embodiments, bits of one or more words are read from SRAM 412 while bits of one or more words are read from eDRAM 420, and the bits from both reads are merged to form the block of data to be loaded into the computing circuitry to be executed.

eDRAM 420 includes a memory array that may be logically separated into a fast access region 422 and slower access region 424 to provide further granularity of access speed to meet the requirement of some applications. In some embodiments, the fast access region 422 are the memory cells that are close to the column input/output circuit of the memory array. For example, a block of memory cells in a row of memory cells that are close to the column input/ output circuit are considered in the fast access region 422 while the remaining memory cells in the row are considered in the slower access region 424. Each row of the memory array may be logically separated as shown in FIG. 4, where the memory cells corresponding to the lower addresses are closer to the column input/output circuit and are considered as in the fast access region 422, while the memory cells corresponding to the higher addresses are further away from the column input/output circuit and are considered as in the slower access region 424.

When data is written to eDRAM 420, the memory controller may determine whether the data will be accessed frequently, and if so, the data will be written into the fast access region 422; otherwise, the data will be written into the slower access region 424. The memory controller may implement a FVC logic/circuit 305, which may count the access frequency of the data based on an access record and determine the data is frequently accessed once the access frequency is over a threshold (predetermined or dynamically learned). The memory controller may mark the data with a FVC indication. Once the eDRAM 420 identifies that the data has a FVC indication, it writes the data to the fast access region 422, otherwise it writes the data to the slower access region 424. Alternatively, the FVC indication of the data is provided prior to the memory controller writing the data, and marking the FVC does not require the FVC logic/circuit 305. Furthermore, the FVC logic/circuit 305 may be implemented within eDRAM 420, so the determination of data access frequency and/or marking the FVC are performed by eDRAM 420 in some embodiments.

In some embodiments, the bits in the fast access region 422 are read first in a clock cycle, and the bits in the slower access region 424 are read in a later clock cycle following that clock cycle so some data can be read faster and packed with data read from SRAM 412.

While discussion above is about forming the word from bits read from SRAM 412 and eDRAM 420, a word of bits can be written to SRAM 412 and eDRAM 420 concurrently as well. The memory controller may control the write to have the bits that are likely accessed more frequently to SRAM 412 while bits that are likely accessed less frequently to eDRAM 420. Within the data written to eDRAM 420, the bits that are relatively accessed more frequently will be written to the fast access region 422, and other bits will be written to the slower access region 424. In some embodiments, data stored in the fast access region 422 has a FVC indication marked (e.g., by the FVC logic/circuit 305).

Note that the access of data from/to SRAM 412 and eDRAM 420 concurrently may be in response to execution of an instruction. For example, a load instruction may cause a concurrent read from SRAM 412 and eDRAM 420, while a store instruction may cause a concurrent write to SRAM 412 and eDRAM 420.

Implementing DRAM to Operate Based on Data Access Characteristics

FIGS. 3 and 4 show that an eDRAM device may include fast and slower access regions, and these regions are divided logically, based on the existing data access characteristics of an eDRAM device. That is, the more frequently accessed values are to be stored in an eDRAM device based on the unaltered eDRAM device where data in some regions of its memory array are accessed faster than other regions. Yet an eDRAM device may be implemented to include multiple memory arrays, where data stored in one of the memory arrays can be accessed faster than data stored in other memory arrays of the eDRAM device.

Figure 5:
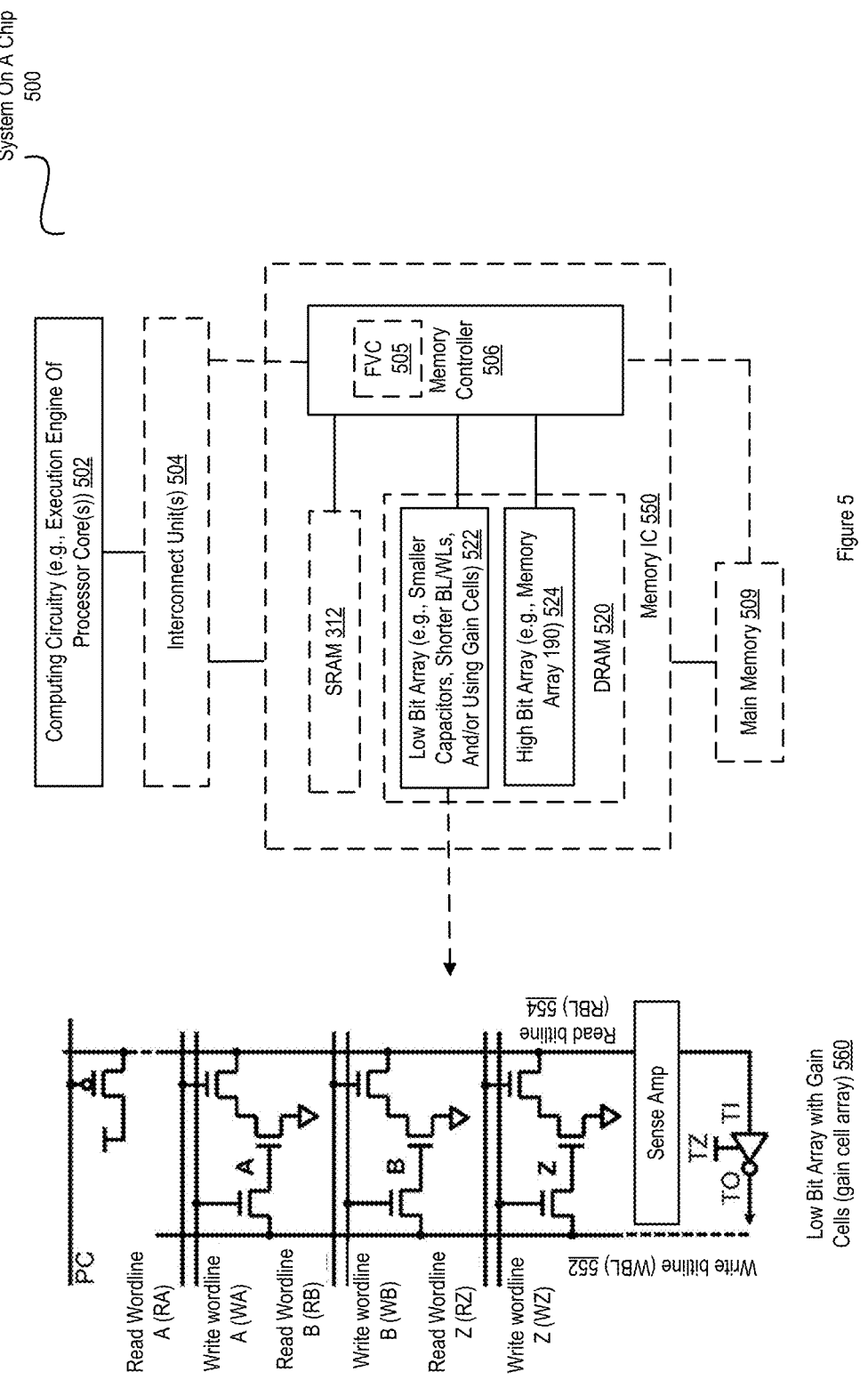
FIG. 5 shows a System on a Chip (SoC) system with two memory arrays with different data access characteristics per some embodiments.

FIG. 5 shows a System on a Chip (SoC) system with two memory arrays with different data access characteristics per some embodiments. SoC 500 is similar to SoC 300 and the same or similar references indicate elements or components having the same or similar functionalities (e.g. computing circuitry 502, interconnect unit(s) 504, memory controller 506, and main memory 509 having the same or similar functionalities of computing circuitry 302, interconnect unit(s) 304, memory controller 306, and main memory 309 respectively), and only the difference in FIG. 5 is discussed below. Note that in memory IC 550, SRAM 312 may or may not be implemented—implementing SRAM 312 provides further granularity to access data based on data access characteristics but the two memory arrays (low and high bit arrays) 522 and 524 by themselves may be implemented as an IC device.

Additionally, instead of one or more homogeneous memory arrays with the same data access characteristics in a DRAM, DRAM 520 includes at least two heterogenous memory arrays with different data access characteristics. The at least two heterogenous memory arrays include a low bit array 522 and a high bit array 524. The low bit arrays 522 is to store data that is accessed more frequently than that in the high bit arrays 524. The data access frequency may be determined by FVC 505 (similar to FVC) DRAM 520, or another device, similar to the determination discussed in FIG. 3. Note while two heterogenous memory arrays are shown as an example, multiple arrays may be implemented with the same data access characteristics, e.g., there may be multiple low bit arrays sharing the same data access characteristics and/or multiple high bit arrays sharing the same data access characteristics that differ from those of the low bit arrays. Additionally, DRAM 520 may implement data arrays to store data that is accessed more frequently than the low bit array 522 and data arrays to store data that is accessed less frequently than the high bit array 524. Thus, data arrays to accommodate data with more than two levels of data access frequencies may be implemented in some embodiments as well.

The high bit array 524 may be implemented similarly as the memory array 190 and contains memory cells that use a TFT as a selector transistor and includes a capacitor for storing a bit. The high bit array 524 has the same data access characteristics of the memory array 190. For example, the high bit array 524 provides shorter latency, less power consumption than memory arrays in a traditional DRAM.

The low bit array 522 is aimed at providing even faster data access than the high bit array 524. Instead of relying on the logical partition of fast and slower access regions above, which exploits the existing data access characteristics of a memory array in an eDRAM device, some embodiments implement the low bit array 522 to have data access characteristics different from the memory array in an eDRAM device.

In a first approach, the low bit array 522 may be smaller than the high bit array 524. The low bit array 522 contains less memory cells than the high bit array 524 and accessing the data within the former will be faster than accessing the data within the latter. The smaller number of memory cells results in less columns and/or rows in the low bit array 522 comparing to the high bit array 524, and accessing the smaller memory array will be quicker than accessing the larger high bit array 524.

In a second approach, the low bit array 522 may be implemented with shorter wordlines and/or bitlines than the high bit array 524. With shorter wordlines, the row selectors may operate faster; and with shorter bitlines, the column selectors may operate faster.

In a third approach, the low bit array 522 may be implemented with memory cells that each has a smaller capacitor than that of the memory cells in the high bit array 524. A smaller capacitor refers to a capacitor with a lower capacitance as the capacitor with the lower capacitance may be shorter in height comparing to the one with higher capacitance in implementation on a die. The smaller capacitor takes less time to charge and discharge, and accessing the memory cell (e.g., reading from and/or writing to the memory cell) with a smaller capacitor takes less time, thus accessing the lower bit array 522 is faster than the high bit array 524.

In the first to third approaches, the lower bit array 522 implements memory cells that use a TFT as a selector transistor and includes a capacitor for storing a bit. Yet the lower bit array 522 may not use the TFT-eDRAM in some embodiments. In a fourth approach, the low bit array 522 may implemented with memory cells that differ from the ones used in the memory array 190 discussed above. The low bit array 522 may use gain cells to implement the memory cells, differing from the memory cells in the memory array 190 that each uses one transistor and one capacitor (DRAM with such memory cells is referred to as 1T1C DRAM). A gain cell includes at least two transistors and may include a gated diode to increase the retention time and read/write speed. In the low bit array with gain cells (also referred to as a gain cell array) 560, each cell A, B, and Z includes two transistors, and a write bitline (WBL) 552 and a read bitline (RBL) 554 are the paths to write and read the memory cells without interference. A gain cell with two transistors (as shown in FIG. 5) is referred to as 2T gain cell; and gain cells may also be implemented with three transistors (3T) as well.

While a gain cell array can be used to implement a DRAM device similar to the eDRAM device discussed above, the gain cell array is used to implement a content-addressable memory (CAM) device in some embodiments. In these embodiments, the memory controller may supply a data word and the CAM device searches its entire memory to find the data word, and if found (a cache hit), the CAM device returns a list of one or more storage addresses where the word was found. The list of one or more storage addresses may be a link obtained by the memory controller 506 when the cache hit occurs. The CAM device implemented using the gain cell array may provide even faster access time than a DRAM device implemented using the gain cell array. In some embodiments, the CAM device using the gain cell array may be implemented as one of the additional circuits 112 in FIGS. 1 and 2.

Note that two or more of the first to fourth approaches may be combined in some embodiments. For example, the low bit array 522 may be smaller than the high bit array 524, have shorter wordlines and/or bitlines, and/or use smaller capacitors in the memory cells. Or, the low bit array 522 may use gain cells, where the capacitors in the memory cells are smaller than that of the high bit array 524, and where less memory cells are in the gain cell array than that of the high bit array 524. All combinations and permutations of these approaches are within the scope of the invention.

In the heterogenous memory array implementations, the low bit array 522 stores data that is to be accessed frequently, and it provides faster access than the high bit array 524, which is accessed only when necessary because it takes longer to access data stored there. Such implementations of heterogenous memory arrays offer better data access efficiency than the homogenous memory array implementation. The heterogenous memory array implementations may be used together with the logical partition of the memory array 190 within an eDRAM discussed above to provide further granularity in data access of a memory IC.

Operations in Some Embodiments

FIG. 6 illustrates the operation flow of reading bits from both a static random-access memory (SRAM) device and a dynamic random-access memory (DRAM) device per some embodiments. The operations in method 600 are performed by an integrated circuit such as IC 350 and 550 discussed herein.

At reference 602, a first portion of data of a processor is stored in a static random-access memory (SRAM) device within an integrated circuit. At reference 604, a second portion of data of the processor is stored in a dynamic random-access memory (DRAM) device within the integrated circuit. At reference 606, bits are read from both the SRAM and DRAM devices, a first set of bits of a first word to be read from the SRAM device and a second set of bits of the first word to be read from the DRAM device.

In some embodiments, the first set of bits of the first word includes a plurality of concatenated bits from the SRAM device, the plurality of concatenated bits including an encryption status indication of the second set of bits from the DRAM device.

In some embodiments, the first set of bits of the first word includes a plurality of concatenated bits from the SRAM device, the plurality of concatenated bits including encryption information of the second set of bits from the DRAM device.

In some embodiments, a set of most significant bits of the first word is to be read from the SRAM device while a set of less significant bits of the first word is to be read from the DRAM device.

In some embodiments, a first set of addresses within the DRAM device is to store data that has a first access characteristic while a second set of addresses within the DRAM device is to store data that has a second access characteristic.

In some embodiments, the first and second access characteristics are a first type of access frequency and a second type of access frequency that is less frequent than the first type, respectively.

In some embodiments, a first set of addresses corresponds to a first region closer to a column input/output circuit of the DRAM device than a second region for the second set of addresses.

In some embodiments, reading the second set of bits from the DRAM device comprises reading bits from one or more addresses in the first set of addresses first before reading bits from one or more addresses in the second set of addresses.

In some embodiments, the read of the first set of bits from the SRAM device is to take fewer clock cycles than the read of the second set of bits from the DRAM device.

In some embodiments, a memory control circuit (e.g., memory controller 306 or 506) is to write to both the SRAM and DRAM devices, a first set of bits of a second word is to be written to the SRAM device and a second set of bits of the second word is to be written to the DRAM device. The method 600 further includes, at reference 608, writing to both SRAM and DRAM devices, a first set of bits of a second word is to be written to the SRAM device and a second set of bits of the second word is to be written to the DRAM device in some embodiments. While writing to both SRAM and eDRAM is simultaneously starting from the same clock cycle in some embodiments, in other embodiments the writes may not be simultaneous, instead, they may be a few clock cycles apart, but the bits writing to the SRAM and eDRAM are the result of the same write operation (e.g., responsive to a store instruction).

In some embodiments, the second set of bits of the second word is written into a region of memory cell within the DRAM device based on an access characteristic of the second set of bits.

In some embodiments, a memory cell within the DRAM device implements a selector transistor using a thin-film transistor (TFT).

FIG. 7 illustrates the operation flow of an integrated circuit operating based on data access characteristics per some embodiments. The operations in method 700 are performed by an integrated circuit such as IC 550 discussed herein.

At reference 702, cache data is stored in a first array comprising a first plurality of memory cells of an integrated circuit. At reference 704, further cache data is stored in a second array comprising a second plurality of memory cells of the integrated circuit, the second plurality of memory cells implementing a selector transistor of a memory cell within using a thin-film transistor (TFT). The second plurality of memory cells may be memory cells 270 of the memory array 190 discussed above in some embodiments.

At reference 706, a first set of bits is written to the first array of the integrated circuit and a second set of bits is written to the second array of the integrated circuit upon determining the first set of bits is to be accessed more frequently than the second set of bits.

In some embodiments, an access frequency of each of the first and second sets of bits is determined based on a frequent value caching indication of the first and second sets of bits, and the first set of bits is written to the first array upon a determination that a corresponding frequent value caching indication of the first set of bits is set, and the second set of bits is written to the second array upon a determination that a corresponding frequent value caching indication of the second set of bits is not set.

In some embodiments, the first plurality of memory cells implements gain cells, and wherein each gain cell implements a plurality of transistors, at least one transistor for reading and at least one transistor for writing.

In some embodiments, the first plurality of memory cells comprises capacitors that have capacitance lower than that of the second plurality of memory cells.

In some embodiments, the first array comprises wordlines shorter than that of the second array.

In some embodiments, the first array comprises bitlines shorter than that of the second array.

In some embodiments, the first plurality of memory cells is less than the second plurality of memory cells.

In some embodiments, in response to a read request (e.g., caused by executing a load instruction), data cached in the first array is looked up first and data cached in the second array is looked up afterward. In some embodiments, data cached in the first array is looked up in a first clock cycle and data cached in the second array is looked up in a second clock cycle immediately following the first clock cycle. The priority of the look up (e.g., performed by the memory control circuit 506) improves the read efficiency as the first array has a faster access.

In some embodiments, a link to data cached in the first array is obtained (e.g., by the memory controller 506) when a cache hit occurs.

Exemplary Processor Architecture and Data Types

Figures 8A, 8B:
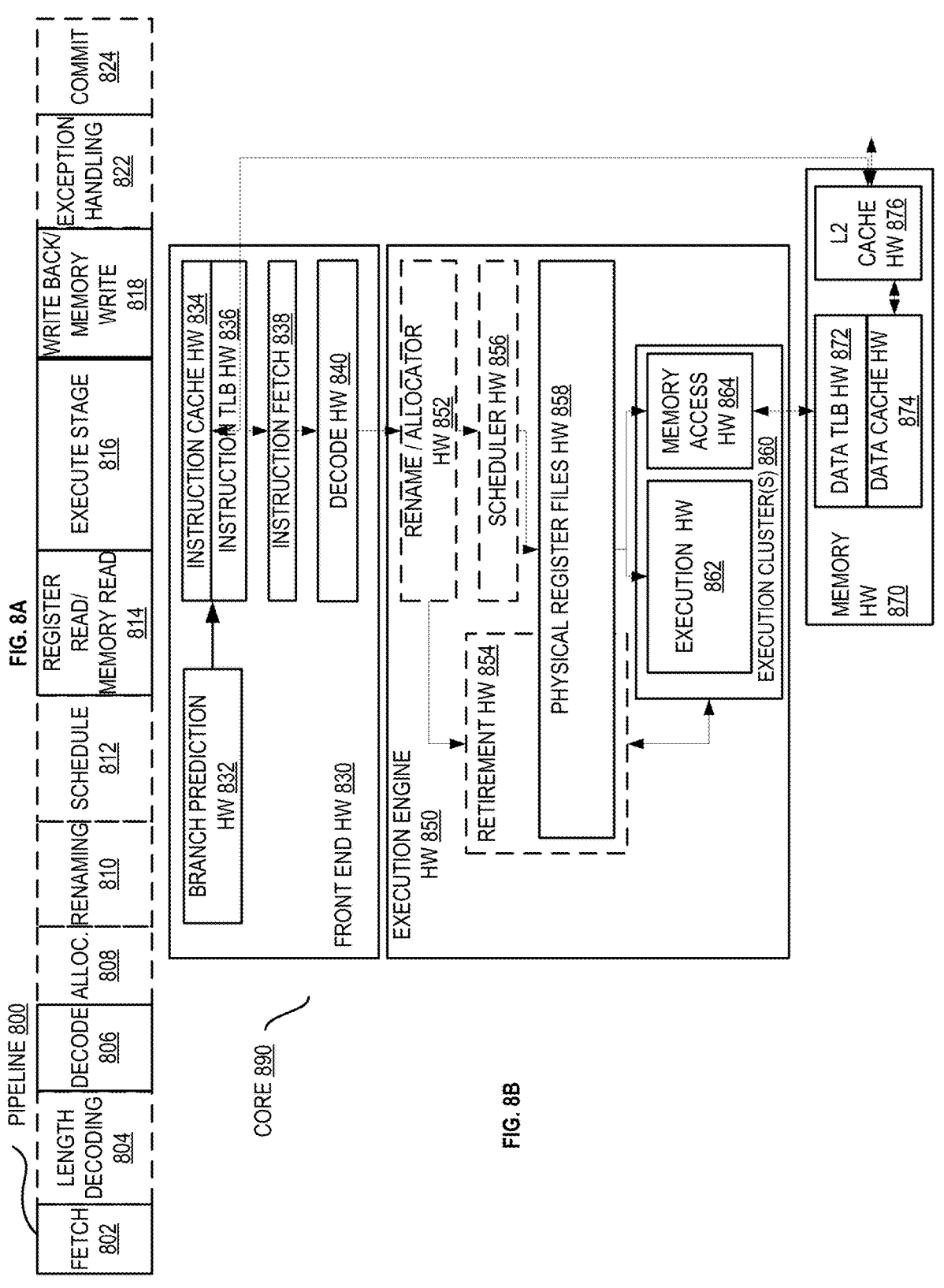
FIG. 8A is a block diagram illustrating both an exemplary in-order pipeline and an exemplary register renaming, out-of-order issue/execution pipeline according to embodiments of the invention.
FIG. 8B is a block diagram illustrating both an exemplary embodiment of an in-order architecture core and an exemplary register renaming, out-of-order issue/execution architecture core to be included in a processor according to embodiments of the invention.

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end hardware 830 coupled to an execution engine hardware (also referred to as execution circuit) 850, and both are coupled to a memory hardware 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end hardware 830 includes a branch prediction hardware 832 coupled to an instruction cache hardware 834, which is coupled to an instruction translation lookaside buffer (TLB) 836, which is coupled to an instruction fetch hardware 838, which is coupled to a decode hardware 840. The decode hardware 840 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode hardware 840 or otherwise within the front end hardware 830). The decode hardware 840 is coupled to a rename/allocator hardware 852 in the execution engine hardware 850.

The execution engine hardware 850 includes the rename/allocator hardware 852 coupled to a retirement hardware 854 and a set of one or more scheduler hardware 856. The scheduler hardware 856 represents any number of different schedulers, including reservations stations, central instruction window, etc. The scheduler hardware 856 is coupled to the physical register file(s) hardware 858. Each of the physical register file(s) hardware 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 858 comprises a vector registers hardware, a write mask registers hardware, and a scalar registers hardware. This register hardware may provide architectural vector registers, vector mask registers, and general purpose registers. The physical register file(s) hardware 858 is overlapped by the retirement hardware 854 to illustrate various ways in which register renaming and out-of-order execution may be implemented (e.g., using a reorder buffer(s) and a retirement register file(s); using a future file(s), a history buffer(s), and a retirement register file(s); using a register map(s) and a pool of registers; etc.). The retirement hardware 854 and the physical register file(s) hardware 858 are coupled to the execution cluster(s) 860. The execution cluster(s) 860 includes a set of one or more execution hardware 862 and a set of one or more memory access hardware 864. The execution hardware 862 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 856, physical register file(s) hardware 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 864). It should also be understood that where separate pipelines are used, one or more of these pipelines may be out-of-order issue/execution and the rest in-order.

The set of memory access hardware 864 is coupled to the memory hardware 870, which includes a data TLB hardware 872 coupled to a data cache hardware 874 coupled to a level 2 (L2) cache hardware 876. In one exemplary embodiment, the memory access hardware 864 may include a load hardware, a store address hardware, and a store data hardware, each of which is coupled to the data TLB hardware 872 in the memory hardware 870. The instruction cache hardware 834 is further coupled to a level 2 (L2) cache hardware 876 in the memory hardware 870. The L2 cache hardware 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode hardware 840 performs the decode stage 806; 3) the rename/allocator hardware 852 performs the allocation stage 808 and renaming stage 810; 4) the scheduler hardware 856 performs the schedule stage 812; 5) the physical register file(s) hardware 858 and the memory hardware 870 perform the register read/memory read stage 814; the execution cluster 860 performs the execute stage

816; 6) the memory hardware 870 and the physical register file(s) hardware 858 perform the write back/memory write stage 818; 7) various hardware may be involved in the exception handling stage 822; and 8) the retirement hardware 854 and the physical register file(s) hardware 858 perform the commit stage 824.

The core 890 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 890 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 834/874 and a shared L2 cache hardware 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9:
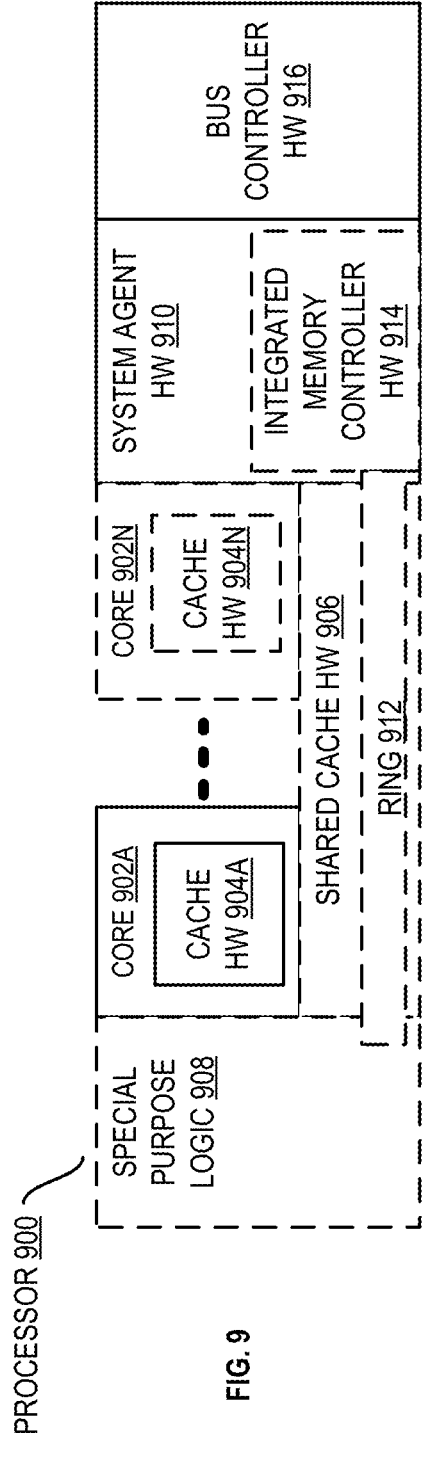
FIG. 9 is a block diagram of a single core processor and a multicore processor with integrated memory controller and graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller hardware 916, while the optional addition of the dashed lined boxes illustrates an alternative processor 900 with multiple cores 902A-N, a set of one or more integrated memory controller hardware 914 in the system agent hardware 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set of one or more shared cache hardware 906, and external memory (not shown) coupled to the set of integrated memory controller hardware 914. The set of shared cache hardware 906 may include one or more mid-level caches, such as level 2 (L2), level 3 (L3), level 4 (L4), or other levels of cache, a last level cache (LLC), and/or combinations thereof. While in one embodiment a ring based interconnect hardware 912 interconnects the integrated graphics logic 908, the set of shared cache hardware 906, and the system agent hardware 910/integrated memory controller hardware 914, alternative embodiments may use any number of well-known techniques for interconnecting such hardware. In one embodiment, coherency is maintained between one or more cache hardware 906 and cores 902-A-N.

In some embodiments, one or more of the cores 902A-N are capable of multi-threading. The system agent 910 includes those components coordinating and operating cores 902A-N. The system agent hardware 910 may include for example a power control unit (PCU) and a display hardware. The PCU may be or include logic and components needed for regulating the power state of the cores 902A-N and the integrated graphics logic 908. The display hardware is for driving one or more externally connected displays.

The cores 902A-N may be homogenous or heterogeneous in terms of architecture instruction set; that is, two or more of the cores 902A-N may be capable of execution of the same instruction set, while others may be capable of executing only a subset of that instruction set or a different instruction set. In one embodiment, the cores 902A-N are heterogeneous and include both the "small" cores and "big" cores described below.

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
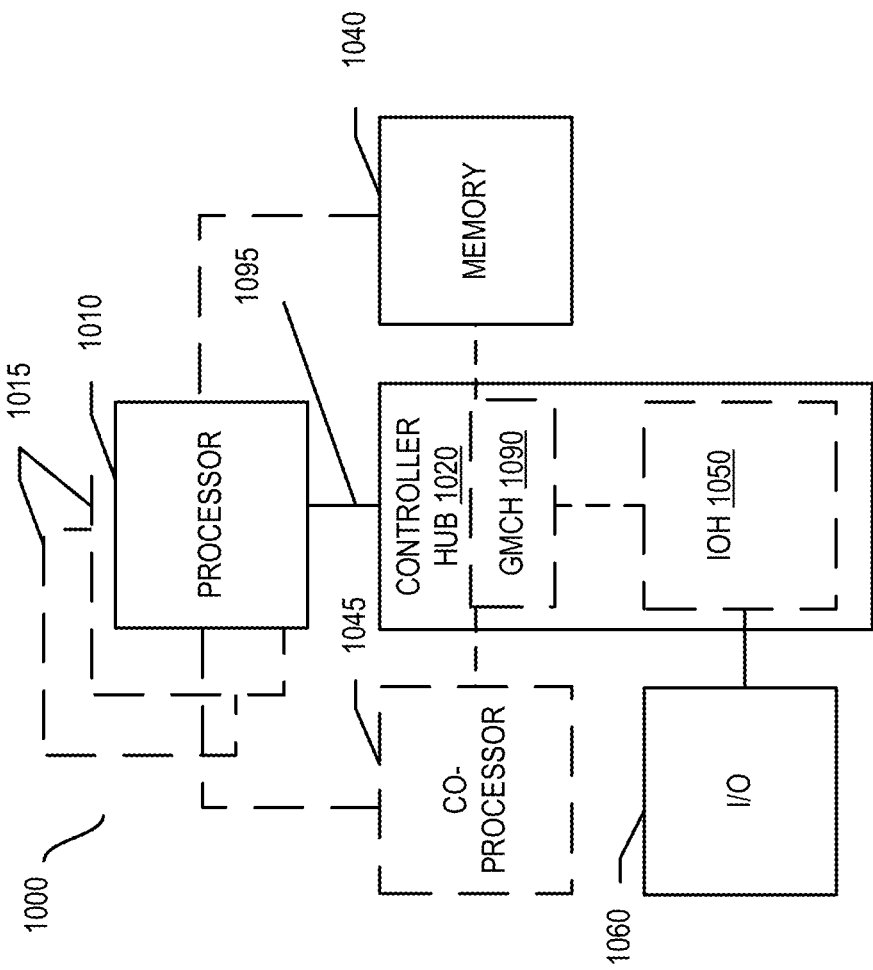
FIG. 10 illustrates a block diagram of a system in accordance with one embodiment of the present invention.

Referring now to FIG. 10, shown is a block diagram of a system 1000 in accordance with one embodiment of the present invention. The system 1000 may include one or more processors 1010, 1015, which are coupled to a controller hub 1020. In one embodiment, the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface, or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
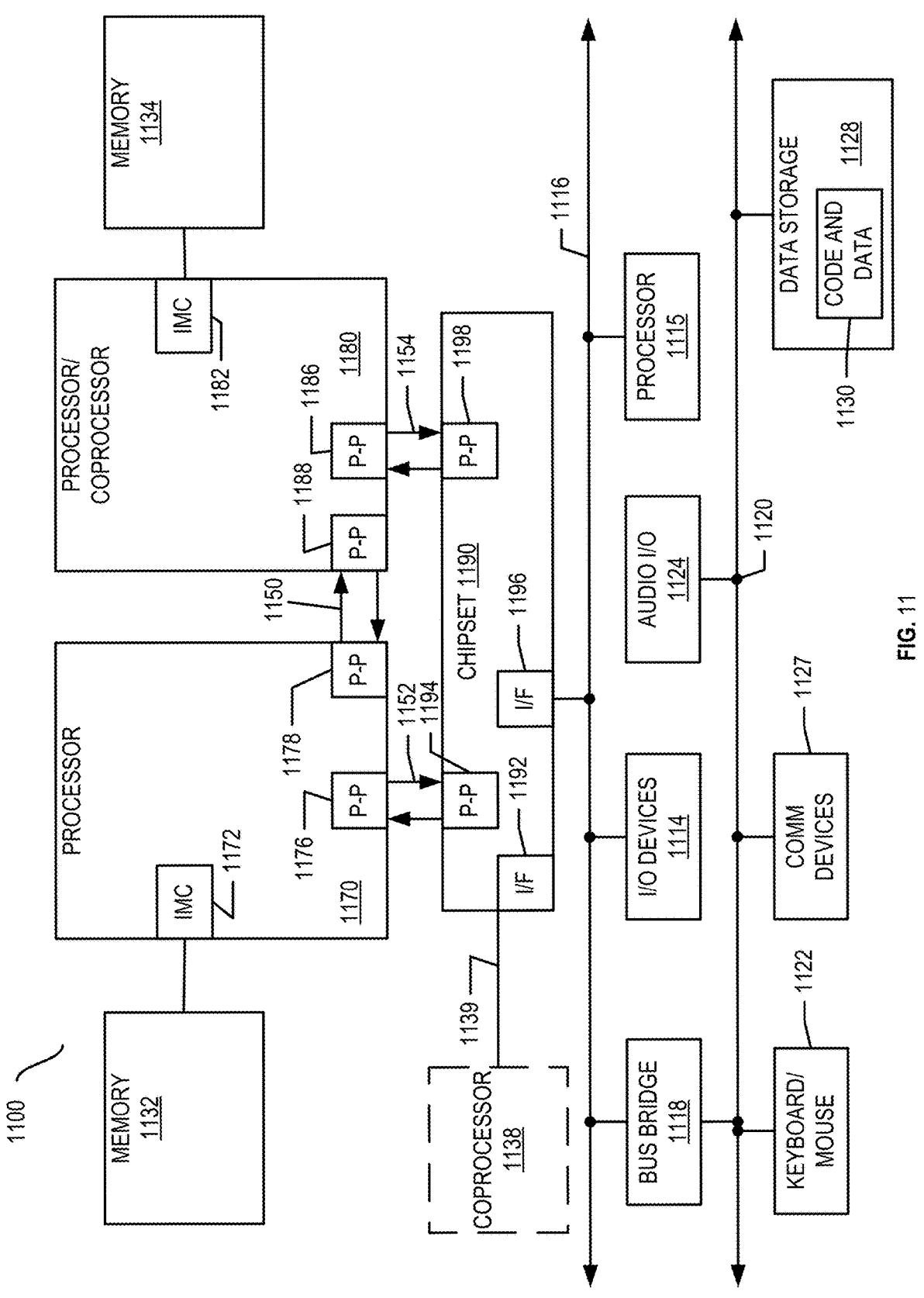
FIG. 11 illustrates a block diagram of a second system in accordance with an embodiment of the present invention.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) hardware 1172 and 1182, respectively. Processor 1170 also includes as part of its bus controller hardware point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) hardware), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication device 1127, and a storage hardware 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
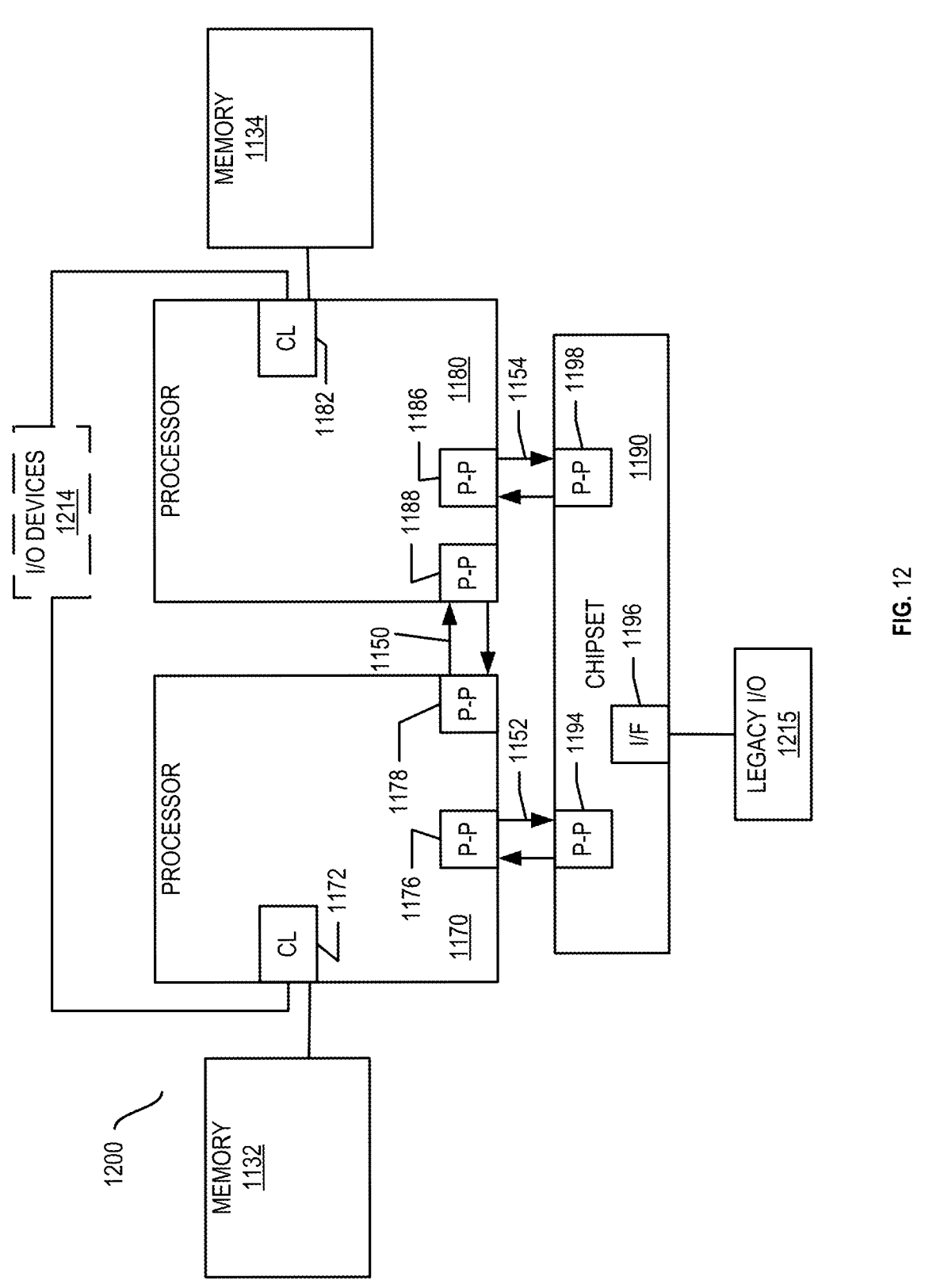
FIG. 12 illustrates a block diagram of a third system in accordance with an embodiment of the present invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller hardware and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
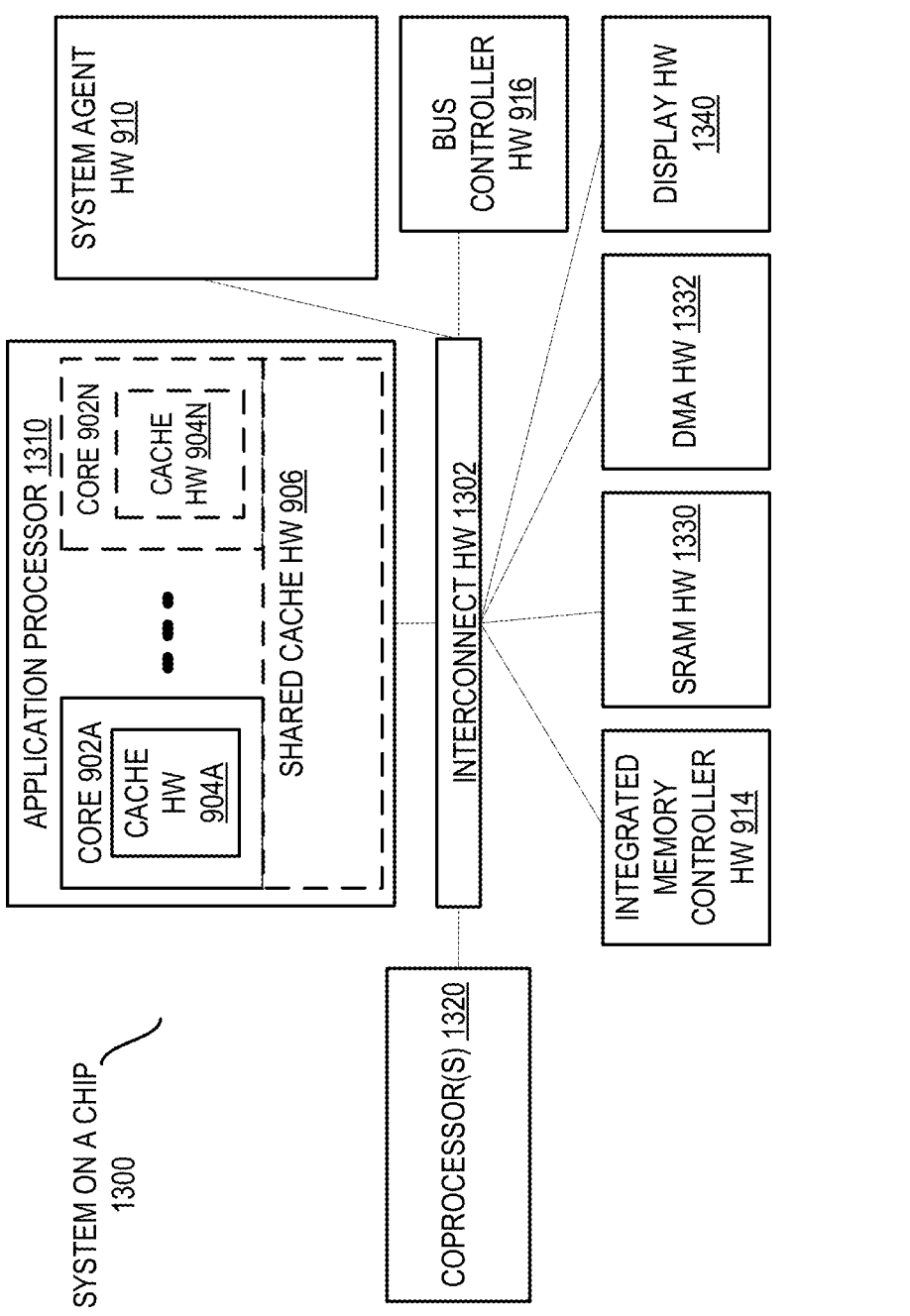
FIG. 13 illustrates a block diagram of a system on a chip (SoC) in accordance with an embodiment of the present invention.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect hardware 1302 is coupled to: an application processor 1310 which includes a set of one or more cores 902A-N and shared cache hardware 906; a system agent hardware 910; a bus controller hardware 916; an integrated memory controller hardware 914; a set or one or more coprocessors 1320 which may include integrated graphics logic, an image processor, an audio processor, and a video processor; a static random access memory (SRAM) hardware 1330; a direct memory access (DMA) hardware 1332; and a display hardware 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors, and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
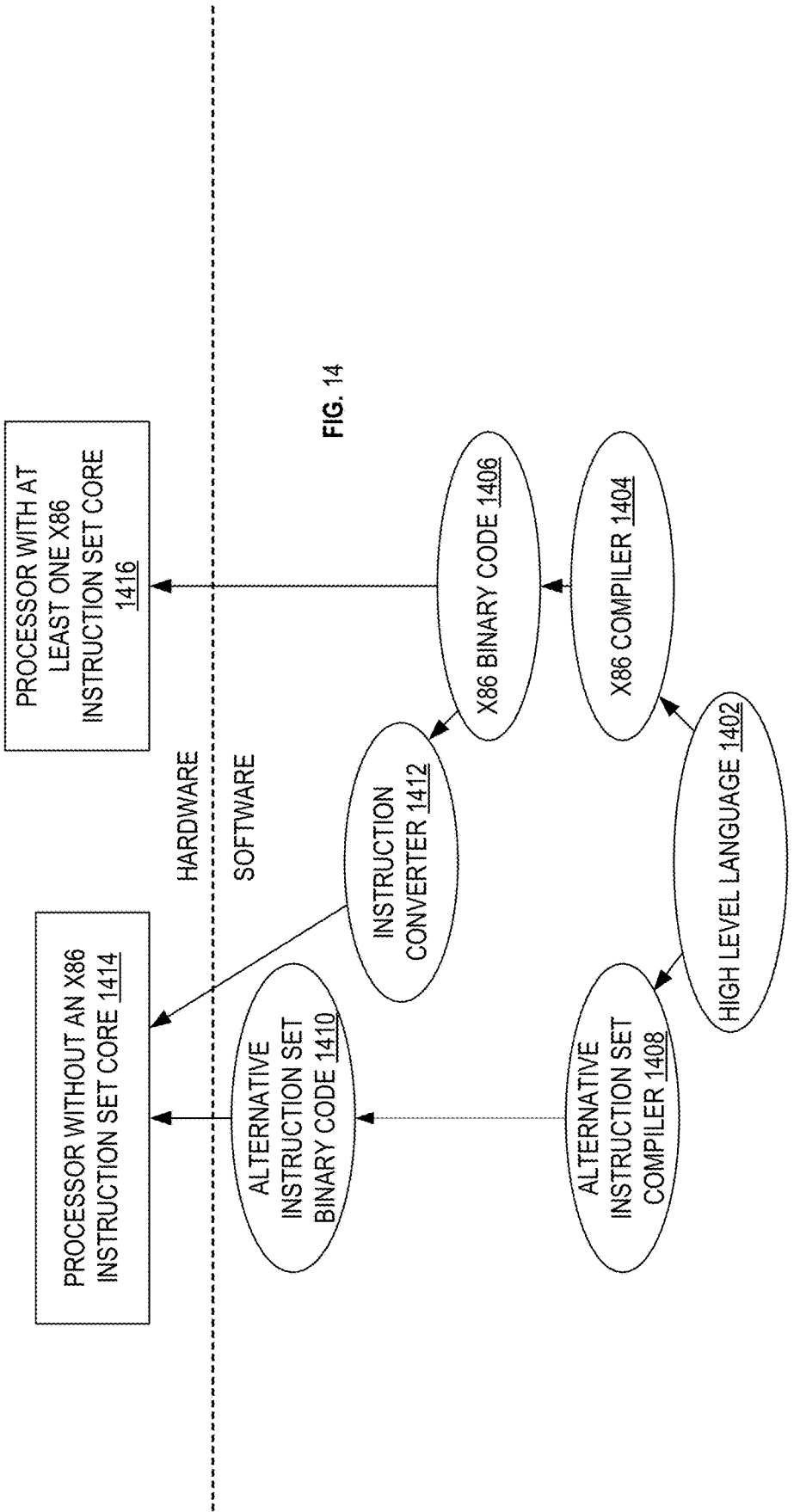
FIG. 14 illustrates a block diagram contrasting the use of a software instruction converter to convert binary instructions in a source instruction set to binary instructions in a target instruction set according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation, or any other process, allows a processor or other electronic device that does not have an x86 instruction set processor or core to execute the x86 binary code 1406.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need to be included in a particular embodiment or embodiments. If the specification states a component, feature, structure, or characteristic "may", "might", "can", or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

FURTHER EXAMPLES

Example 1 provides an exemplary integrated circuit comprising a first array comprising a first plurality of memory cells; a second array comprising a second plurality of memory cells, both first and second arrays being to store data of a processor, the second plurality of memory cells implementing a selector transistor of a memory cell within using a thin-film transistor (TFT); and a memory control circuit to write a first set of bits to the first array and a second set of bits to the second array upon determining the first set of bits is to be accessed more frequently than the second set of bits.

Example 2 includes the substance of Example 1, wherein an access frequency of each of the first and second sets of bits is determined based on a frequent value caching indication of the first and second sets of bits, and wherein the memory control circuit is to write the first set of bits to the first array upon a determination that a corresponding frequent value caching indication of the first set of bits is set, and to write the second set of bits to the second array upon a determination that a corresponding frequent value caching indication of the second set of bits is not set.

Example 3 includes the substance of Examples 1 to 2, wherein the first plurality of memory cells implements gain cells, and wherein each gain cell implements a plurality of transistors, at least one transistor for reading and at least one transistor for writing.

Example 4 includes the substance of Examples 1 to 3, wherein the first plurality of memory cells comprises capacitors that have capacitance lower than that of the second plurality of memory cells.

Example 5 includes the substance of Examples 1 to 4, wherein the first array comprises wordlines shorter than that of the second array.

Example 6 includes the substance of Examples 1 to 5, where the first array comprises bitlines shorter than that of the second array.

Example 7 includes the substance of Examples 1 to 6, wherein the first plurality of memory cells is less than the second plurality of memory cells.

Example 8 includes the substance of Examples 1 to 7, wherein in response to a read request, the memory control circuit is to look up data cached in the first array first and to look up data cached in the second array afterward.

Example 9 includes the substance of Examples 1 to 8, wherein the memory control circuit is to look up data cached in the first array in a first clock cycle and to look up data cached in the second array in a second clock cycle immediately following the first clock cycle.

Example 10 includes the substance of Examples 1 to 9, wherein the memory control circuit is to obtain a link to data cached in the first array when a cache hit occurs.

Example 11 provides an exemplary method, including storing cache data in a first array comprising a first plurality of memory cells of an integrated circuit and storing further cache data in a second array comprising a second plurality of memory cells of the integrated circuit, the second plurality of memory cells implementing a selector transistor of a memory cell within using a thin-film transistor (TFT). The method further includes writing a first set of bits to the first array of the integrated circuit and a second set of bits to the second array of the integrated circuit upon determining the first set of bits is to be accessed more frequently than the second set of bits.

Example 12 includes the substance of Example 11, wherein an access frequency of each of the first and second sets of bits is determined based on a frequent value caching indication of the first and second sets of bits, and wherein the first set of bits is written to the first array upon a determination that a corresponding frequent value caching indication of the first set of bits is set, and the second set of bits is written to the second array upon a determination that a corresponding frequent value caching indication of the second set of bits is not set.

Example 13 includes the substance of Examples 11 to 12, wherein the first plurality of memory cells implements gain cells, and wherein each gain cell implements a plurality of transistors, at least one transistor for reading and at least one transistor for writing.

Example 14 includes the substance of Examples 11 to 13, wherein the first plurality of memory cells comprises capacitors that have capacitance lower than that of the second plurality of memory cells.

Example 15 includes the substance of Examples 11 to 14, wherein in response to a read request, data cached in the first array is looked up first and data cached in the second array is looked up afterward.

Example 16 provides an exemplary computer-readable storage medium storing instructions that when executed by a processor of a computing system, are capable of causing the computing system to perform: storing cache data in a first array comprising a first plurality of memory cells of an integrated circuit and storing further cache data in a second array comprising a second plurality of memory cells of the integrated circuit, the second plurality of memory cells implementing a selector transistor of a memory cell within using a thin-film transistor (TFT). The computing system is caused to further perform writing a first set of bits to the first array of the integrated circuit and a second set of bits to the second array of the integrated circuit upon determining the first set of bits is to be accessed more frequently than the second set of bits.

Example 17 includes the substance of Example 16, wherein an access frequency of each of the first and second sets of bits is determined based on a frequent value caching indication of the first and second sets of bits, and wherein the first set of bits is written to the first array upon a determination that a corresponding frequent value caching indication of the first set of bits is set, and the second set of bits is written to the second array upon a determination that a corresponding frequent value caching indication of the second set of bits is not set.

Example 18 includes the substance of Examples 16 to 17, wherein the first plurality of memory cells implements gain cells, and wherein each gain cell implements a plurality of transistors, at least one transistor for reading and at least one transistor for writing.

Example 19 includes the substance of Examples 16 to 18, wherein the first plurality of memory cells comprises capacitors that have capacitance lower than that of the second plurality of memory cells.

Example 20 includes the substance of Examples 16 to 19, wherein when executed by the processor of the computing system, the instructions are capable of causing the computing system to further perform: looking up data cached in the first array first and looking up data cached in the second array afterward.

Additional Explanation

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer-readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical, or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well-known structures and functions were not described in elaborate detail in order to avoid obscuring the subject matter of the present invention. Accordingly, the scope and spirit of the invention should be judged in terms of the claims which follow.

What is claimed is:

1. An integrated circuit comprising:
    a static random-access memory (SRAM) device to store a first portion of data of a processor;
    a dynamic random-access memory (DRAM) device to store a second portion of the data of the processor; and
    a memory control circuit to read from both the SRAM and DRAM devices, a first set of bits of a first word to be read from the SRAM device and a second set of bits of the first word to be read from the DRAM device,
    wherein reading the second set of bits from the DRAM device comprises reading bits from one or more addresses in a first set of addresses first before reading bits from one or more addresses in a second set of addresses, wherein the first set of addresses corresponds to a first region closer to a column input/output circuit of the DRAM device than a second region for the second set of addresses.

2. The integrated circuit of claim 1, wherein the first set of bits of the first word includes a plurality of concatenated bits from the SRAM device, the plurality of concatenated bits including an encryption status indication of the second set of bits from the DRAM device.

3. The integrated circuit of claim 1, wherein the first set of bits of the first word includes a plurality of concatenated bits from the SRAM device, the plurality of concatenated bits including encryption information of the second set of bits from the DRAM device.

4. The integrated circuit of claim 1, wherein a set of most significant bits of the first word is to be read from the SRAM device while a set of less significant bits of the first word is to be read from the DRAM device.

5. The integrated circuit of claim 1, wherein the first set of addresses within the DRAM device is to store data that has a first access characteristic while the second set of addresses within the DRAM device is to store data that has a second access characteristic.

6. The integrated circuit of claim 5, wherein the first and second access characteristics are a first type of access frequency and a second type of access frequency that is less frequent than the first type, respectively.

7. The integrated circuit of claim 1, wherein the read of the first set of bits from the SRAM device is to take fewer clock cycles than the read of the second set of bits from the DRAM device.

8. The integrated circuit of claim 1, wherein the memory control circuit is to write to both the SRAM and DRAM devices, a first set of bits of a second word is to be written to the SRAM device and a second set of bits of the second word is to be written to the DRAM device.

9. The integrated circuit of claim 8, wherein the second set of bits of the second word is written into a region of memory cell within the DRAM device based on an access characteristic of the second set of bits of the second word.

10. The integrated circuit of claim 1, wherein a memory cell within the DRAM device implements a selector transistor using a thin-film transistor (TFT).

11. A method comprising:
    storing a first portion of data of a processor in a static random-access memory (SRAM) device within an integrated circuit;
    storing a second portion of data of the processor in a dynamic random-access memory (DRAM) device within the integrated circuit; and
    reading from both the SRAM and DRAM devices, a first set of bits of a first word to be read from the SRAM device and a second set of bits of the first word to be read from the DRAM device, wherein reading the second set of bits from the DRAM device comprises reading bits from one or more addresses in a first set of addresses first before reading bits from one or more addresses in a second set of addresses, wherein the first set of addresses corresponds to a first region closer to a column input/output circuit of the DRAM device than a second region for the second set of addresses.

12. The method of claim 11, wherein the first set of bits of the first word includes a plurality of concatenated bits from the SRAM device, the plurality of concatenated bits including an encryption status indication of the second set of bits from the DRAM device and a data bit stored in the DRAM device.

13. The method of claim 11, wherein a set of most significant bits of the first word is to be read from the SRAM device while a set of less significant bits of the first word is to be read from the DRAM device.

14. The method of claim 11, wherein the first set of addresses within the DRAM device is to store data that has a first access characteristic while the second set of addresses within the DRAM device is to store data that has a second access characteristic.

15. A non-transitory computer-readable storage medium storing instructions that when executed by a processor of a computing system, are capable of causing the computing system to perform:

storing a first portion of data of the processor in a static random-access memory (SRAM) device within an integrated circuit;

storing a second portion of data of the processor in a dynamic random-access memory (DRAM) device within the integrated circuit; and reading from both the SRAM and DRAM devices, a first set of bits of a first word to be read from the SRAM device and a second set of bits of the first word to be read from the DRAM device, wherein reading the second set of bits from the DRAM device comprises reading bits from one or more addresses in a first set of addresses first before reading bits from one or more addresses in a second set of addresses, wherein the first set of addresses corresponds to a first region closer to a column input/output circuit of the DRAM device than a second region for the second set of addresses.

16. The non-transitory computer-readable storage medium of claim 15, wherein the read of the first set of bits from the SRAM device is to take fewer clock cycles than the read of the second set of bits from the DRAM device.

17. The non-transitory computer-readable storage medium of claim 15, wherein when executed by the processor of the computing system, the instructions are capable of causing the computing system to further perform:

writing to both the SRAM and DRAM devices, a first set of bits of a second word is to be written to the SRAM device and a second set of bits of the second word is to be written to the DRAM device.

18. The non-transitory computer-readable storage medium of claim 15, wherein a memory cell within the DRAM device implements a selector transistor using a thin-film transistor (TFT).

*  *  *  *  *